US012795244B2

(12) United States Patent
Xie et al.

(10) Patent No.: US 12,795,244 B2
(45) Date of Patent: Nov. 10, 2026

(54) ELECTRONIC APPARATUS, METHOD FOR AUTOMATIC EXPOSURE USING TONE MAPPING

(71) Applicant: SAMSUNG ELECTRONICS CO., LTD., Suwon-si (KR)

(72) Inventors: Zheng Xie, Beijing (CN); Jianxing Zhang, Beijing (CN); Ouyang Jia, Beijing (CN); Hyunhee Park, Suwon-si (KR); Xiaoxia Xing, Beijing (CN); Daejung Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 18/967,208

(22) Filed: Dec. 3, 2024

(65) Prior Publication Data

US 2026/0025589 A1 Jan. 22, 2026

Related U.S. Application Data

(63) Continuation of application No. PCT/KR2024/017423, filed on Nov. 6, 2024.

(30) Foreign Application Priority Data

Jul. 19, 2024 (CN) ......................... 202410977968.3

(51) Int. Cl.
*H04N 23/73* (2023.01)
*H04N 23/71* (2023.01)
*H04N 23/76* (2023.01)

(52) U.S. Cl.
CPC ............. *H04N 23/73* (2023.01); *H04N 23/71* (2023.01); *H04N 23/76* (2023.01)

(58) Field of Classification Search
CPC ........ H04N 23/73; H04N 23/71; H04N 23/76; H04N 23/72; H04N 23/667; H04N 23/741; H04N 23/95
See application file for complete search history.

(56) References Cited

U.S. PATENT DOCUMENTS 9,087,382 B2 7/2015 Zhai et al.
9,413,980 B1 8/2016 Qi
9,432,647 B2 8/2016 Guo et al.
10,482,585 B1 * 11/2019 Lin .......................... G06T 5/92
11,477,383 B2 10/2022 Park et al.
(Continued)

FOREIGN PATENT DOCUMENTS

EP 4 460 027 A1 11/2024
WO 2024/027331 A1 2/2024

OTHER PUBLICATIONS

"Middle Gray", Wikipedia, https://en.wikipedia.org/wiki/Middle_gray (4 pages total).
(Continued)

*Primary Examiner* — Chiawei Chen
(74) *Attorney, Agent, or Firm* — Sughrue Mion, PLLC

(57) ABSTRACT

A method performed by an electronic apparatus, includes acquiring a first image feature of a first image, performing tone mapping on the first image based on the first image feature to obtain feature information associated with the tone mapping, and predicting an image exposure parameter for a second image based on the first image feature and the feature information.

20 Claims, 19 Drawing Sheets

(56) References Cited

U.S. PATENT DOCUMENTS

| | | | | |
|---|---|---|---|---|
| 11,689,826 | B2 * | 6/2023 | Cote | H04N 25/67 348/241 |
| 12,243,203 | B2 * | 3/2025 | Aluru | G06T 5/92 |
| 2010/0309346 | A1 * | 12/2010 | Brunner | H04N 23/82 348/E5.022 |
| 2010/0329554 | A1 * | 12/2010 | Zhai | G09G 3/2003 382/167 |
| 2013/0083838 | A1 * | 4/2013 | Touze | H04N 19/33 375/E7.026 |
| 2014/0079335 | A1 | 3/2014 | Sun | |
| 2015/0271405 | A1 * | 9/2015 | Lameer | H04N 23/741 348/222.1 |
| 2021/0250564 | A1 | 8/2021 | Pieri et al. | |
| 2022/0239822 | A1 | 7/2022 | Genov et al. | |
| 2022/0256068 | A1 * | 8/2022 | Geiss | H04N 23/631 |
| 2023/0058934 | A1 * | 2/2023 | Nikkanen | H04N 23/88 |
| 2023/0069500 | A1 | 3/2023 | Sudret et al. | |
| 2023/0419463 | A1 | 12/2023 | Unger et al. | |
| 2024/0406573 | A1 * | 12/2024 | Grundhoefer | G02B 27/017 |

OTHER PUBLICATIONS

Shin et al., "Camera Exposure Control for Robust Robot Vision with Noise-Aware Image Quality Assessment", KAIST, 2019, IROS2019, arXiv:1907.1264v1 [cs.CV] Jul. 11, 2019 (8 pages total).

Onzon et al., "Neural Auto-Exposure for High-Dynamic Range Object Detection", IEEE Xplore, 2021, CVPR2021, pp. 7710-7720 (11 pages total).

International Search Report and Written Opinion (PCT/ISA/220, PCT/ISA/210, and PCT/ISA/237) dated Apr. 11, 2025, issued by International Searching Authority for International Application No. PCT/KR2024/017423.

Lee et al., "Learning to Control Camera Exposure via Reinforcement Learning", arXiv:2404.01636v1 [cs.CV] , Apr. 2, 2024, pp. 1-13 (13 pages total).

* cited by examiner

Preview image

Snapshot image

ELECTRONIC APPARATUS, METHOD FOR AUTOMATIC EXPOSURE USING TONE MAPPING

CROSS-REFERENCE TO RELATED APPLICATIONS

This application is a continuation application of International Application No. PCT/KR2024/017423, filed on Nov. 6, 2024, which claims priority to Chinese Patent Application No. 202410977968.3, filed on Jul. 19, 2024, the disclosures of which are incorporated by reference herein in their entireties.

BACKGROUND

1. Field

The present disclosure relates to a field of image processing and a field of artificial intelligence, and more particularly to an electronic apparatus and a method for automatic exposure using tone mapping.

2. Description of Related Art

With the development of various smart apparatuses (e.g., smart phones, cameras, etc.), users are increasingly demanding of image quality and shooting experience. Image exposure control may affect the quality of the generated image, but an image sensor does not have the ability to adapt itself according to the light intensity in different scenes, and thus it may be necessary to use an automatic exposure function to ensure that the captured photographs obtain accurate exposure which is thereby conducive to generating satisfactory image effects. However, there may be difficulties with the related automatic exposure control, for example, unstable brightness in the time dimension, inconsistencies of images obtained in a preview mode and a snapshot mode, and a long exposure stabilization time, which make it difficult to provide users with satisfactory image quality or shooting experience based on the related automatic exposure control scheme.

SUMMARY

In accordance with an aspect of the disclosure, a method for automatic exposure control using tone mapping may comprise including obtaining a first image feature of a first image. In accordance with an aspect of the disclosure, the method for automatic exposure control using tone mapping may comprise performing tone mapping on the first image based on the first image feature to obtain feature information associated with the tone mapping. In accordance with an aspect of the disclosure, the method for automatic exposure control using tone mapping may comprise predicting an image exposure parameter for a second image based on the first image feature and the feature information, wherein the second image is a next frame image of the first image. In accordance with an aspect of the disclosure, the method for automatic exposure control using tone mapping may comprise controlling an automatic exposure of the second image based on the image exposure parameter.

In accordance with an aspect of the disclosure, An electronic apparatus for automatic exposure control using tone mapping may include memory storing instructions. In accordance with an aspect of the disclosure, An electronic apparatus for automatic exposure control using tone mapping may include at least one processor including processing circuitry, memory storing instructions that, when executed by the at least one processor individually or collectively, cause the electronic apparatus to perform the method corresponding.

One embodiment provides a machine readable medium containing instructions. The instructions, when executed by at least one processor, may cause the at least one processor to perform the method corresponding.

It should be understood that the above description and the detailed descriptions that follow are merely exemplary and explanatory and do not limit the present disclosure.

BRIEF DESCRIPTION OF THE DRAWINGS

The accompanying drawings herein are incorporated into and form part of the disclosure, illustrate embodiments consistent with the disclosure, in which.

DETAILED DESCRIPTION

Figure 1:
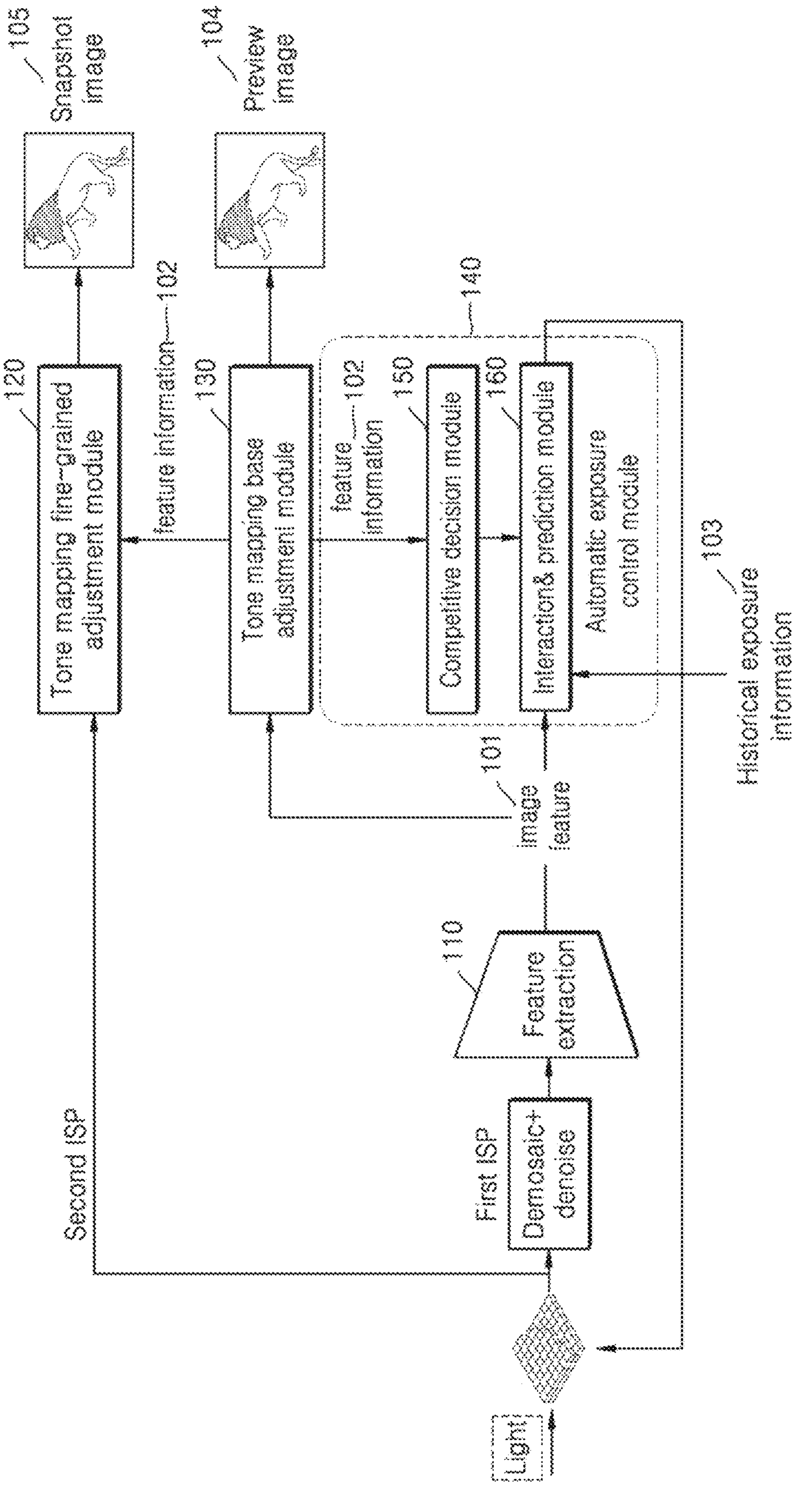
FIG. 1 is an example architectural diagram, according to an embodiment of the present disclosure.

The following description with reference to the accompanying drawings is provided to aid in a thorough understanding of one or more embodiments of the present disclosure as defined by claims and equivalents thereof. This description includes various details to aid in understanding but should only be considered exemplary. Accordingly, those ordinary skills in the art will recognize that various changes and modifications can be made to the various embodiments described herein without departing from the scope and spirit of the present disclosure. In addition, descriptions of well-known features and structures may be omitted for the sake of clarity and brevity.

The terms and phrases used in the claims and the following description are not limited to dictionary meaning thereof, but are used to enable a clear and consistent understanding of the present disclosure. Accordingly, it should be apparent to those skilled in the art that, the following description of the various embodiments of the present disclosure is provided for an illustrative purpose only and is not intended to a purpose of limiting the present disclosure as defined by the appended claims and equivalents thereof.

It should be understood that, “a”, “an” and “the” in a singular form may also include a plural reference, unless the context clearly indicates otherwise. Thus, for example, a reference to a “part surface” includes a reference to one or more such surfaces. When it refers to one element as being “connected” or “coupled” to another element, the one element may be directly connected or coupled to the other element, or it may refer to a connection relationship between the one element and the other element established through an intermediate element. In addition, “connected” or “coupled” as used herein may include wirelessly connected or wirelessly coupled.

The term “include” or “may include” refers to the presence of a function, operation, or component of the corresponding disclosure that may be used in the various embodiments of the present disclosure, and does not limit the presence of one or more additional functions, operations, or features. In addition, the terms “include” or “have” may be interpreted to denote certain features, figures, steps, operations, constituent elements, components, or combinations thereof, but should not be interpreted to exclude the possibility of the presence of one or more other features, figures, steps, operations, constituent elements, components, or combinations thereof.

The term “or” as used in the various embodiments of the present disclosure includes any of the listed terms and all combinations thereof. For example, “A or B” may include A, may include B, or may include both A and B. When describing a plurality of (two or more) items, the plurality of items may refer to one, more, or all of the plurality of items if a relationship among the plurality of items is not explicitly defined. For example, for the description “a parameter A comprises A1, A2, A3”, it may be implemented as parameter A comprising A1, A2 or A3, or as parameter A comprising at least two of the three items of the parameter A1, A2, A3.

As is related in the field, the embodiments may be described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

Terms used in the present disclosure may have the same meaning as understood by those skilled in the art to which the present disclosure belongs, unless defined differently. Common terms as defined in dictionaries are interpreted to have a meaning consistent with the context in the relevant technology art and should not be interpreted in an idealized or overly formalistic manner, unless expressly so defined in the present disclosure.

At least part of the functions in a device or electronic apparatus provided in the embodiments of the present disclosure may be implemented through an AI model, such as, at least one of a plurality of modules of the device or electronic apparatus may be implemented through the AI model. A function associated with AI may be performed through the non-volatile memory, the volatile memory, and the processor.

The processor may include one or more processors. At this time, the one or more processors may be a general purpose processor, such as a central processing unit (CPU), an application processor (AP), or the like, or may be a graphics-only processing unit such as a graphics processing unit (GPU), a visual processing unit (VPU), and/or an AI-dedicated processor such as a neural processing unit (NPU).

The one or more processors control processing of input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or an AI model of a desired characteristic is made. The learning may be performed in a device or electronic apparatus itself in which AI according to an embodiment is performed, and/or may be implemented through a separate server/system.

The AI model may consist of a plurality of neural network layers. Each layer has a plurality of weight values, and performs a neural network calculation by calculating between the input data of this layer (such as, a calculation result of the previous layer and/or the input data of the AI model) and the plurality of weight values of the current layer. Examples of neural networks include, but are not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), a generative adversarial networks (GAN), and a deep Q-network.

The learning algorithm is a method for training a predetermined target device (for example, a robot) using a plurality of learning data to cause, allow, or control the target device to make a determination or prediction. Examples of the learning algorithm include, but are not limited to, supervised learning, unsupervised learning, semi-supervised learning, or reinforcement learning.

The methods provided in the present disclosure may involve one or more of technical fields such as speech, language, image, video, or data intelligence.

Alternatively, when involving the field of speech or language, in the method according to the present disclosure executed by electronic apparatus, a speech signal, which is an analog signal, may be received via speech input devices (e.g., a microphone), and the speech part is converted into computer readable text using an automatic speech recognition (ASR) model. The user's intent of utterance may be obtained by interpreting the converted text using a natural language understanding (NLU) model. The ASR model or NLU model may be an artificial intelligence model. The artificial intelligence model may be processed by an artificial intelligence-dedicated processor designed in a hardware structure specified for artificial intelligence model processing. Language understanding is a technique for recognizing and applying/processing human language/text and includes, e.g., natural language processing, machine translation, dialog system, question answering, or speech recognition/synthesis.

Alternatively, when involving the field of image or video, in the method according to the present disclosure executed by electronic apparatus, output data may be obtained by using image data as input data for an artificial intelligence model. The method of the present disclosure may involve the field of visual understanding in the artificial intelligence technology, and the visual understanding is a technique for recognizing and processing things as does human vision and includes, e.g., object recognition, object tracking, image retrieval, human recognition, scene recognition, 3D reconstruction/localization, or image enhancement.

Alternatively, when involving the field of data intelligence processing, in the method according to the present disclosure executed by electronic apparatus, in the reasoning or predicting stage, an artificial intelligence model can be used to perform predictions by using real-time input data. Processors of the electronic apparatus may perform a preprocessing operation on the data to convert into a form appropriate for use as an input for the artificial intelligence model. Reasoning and prediction is a technique of logically reasoning and predicting by determining information and includes, e.g., knowledge-based reasoning, optimization prediction, preference-based planning, or recommendation.

In the present application, the artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

Below, an embodiment of the disclosure will be explained by describing one or more embodiments. It should be noted that, the following embodiments may be referred to, imitated or combined with each other, and the same term, similar features and similar implementation steps in different embodiments will not be described repeatedly.

As described above, users are increasingly demanding of image quality and shooting experience. For example, with the rapid development of smart phones, the lifestyle of users recording and sharing their lives through mobile phones is becoming more and more popular, and users are increasingly demanding of shooting of mobile phones which are useful shooting tools. Regardless of which mobile phone performs the photography, optimal exposure control is a key support for downstream tasks. Exposure may be understood as the optimal combination of an aperture value f, shutter time t and ISO sensitivity. Light intensity varies greatly from scene to scene, and the human eyes have the self-adaptive ability so they may quickly adjust to enable themselves to sense the appropriate brightness, while an image sensor does not have this self-adaptive ability, and thus it may be necessary to use an automatic exposure function to ensure that captured photographs obtain accurate exposure to provide a higher-quality image. However, setting a correct image exposure parameter is not simple due to the high diversity of the scenes to be photographed, and this task becomes even more difficult especially when scenes with poor lighting conditions occur, such as at night or in a backlit scene, if overexposed it may result in a very bright image, while if underexposed it may result in a very dark image. As described in the background, there are many problems with related automatic exposure control, for example, unstable brightness in the time dimension, inconsistencies of images obtained in the preview mode and the snapshot mode, and a long exposure stabilization time, which make it impossible to provide users with satisfactory image quality or shooting experience based on the current automatic exposure control scheme.

For example, the related automatic exposure control suffers from the unstable brightness in the time dimension. When the user is previewing or recording a video, even though the environmental conditions and brightness remain the same, small changes in the scene, such as the user's mobile phone shaking, changes in the character's expression, and fine-tuning of the pose, may result in changes in the brightness of the picture, and the shooting picture may look like having a flickering effect, which affects the user experience. Small changes in the character's expression lead to changes in the overall exposure level, the reason for which is the fact that the related automatic exposure control is only based on a brightness statistic of the current image to predict the image exposure parameter, which is essentially just calculating the average brightness of the selected region, and the brightness statistic is susceptible to the effects of noise and abnormal values, and even small changes in the content of the image may result in inaccurate exposure estimation, which leads to a situation of flickering of the picture.

For an example, the related automatic exposure control suffers from the inconsistencies of the preview mode and the snapshot mode. When the user is in the shooting process and has not yet pressed a photo button, the shooting picture presented by the mobile phone is in the preview mode of the mobile phone. The purpose of the preview mode of the smart phone is to allow the user to perceive the quality of the final shot in real time, realizing an experience of "what you see is what you get". However, under the same lighting conditions and the scene, there may be significant differences in color and brightness between the picture presented in the preview mode and the final image obtained in the snapshot mode. This is because the preview mode and the snapshot mode existing in the camera system of current mobile apparatuses utilize different image signal processing (ISP) pipelines, and different ISP pipelines contain different tone mapping modules, which may affect the color and brightness of the image. If there is a big difference between tone mappings in these two pipelines, even for the same scene, the image effects of the preview mode and the snapshot mode may be very different in terms of color and brightness. As a result, it will affect the user's shooting experience.

For an example, the related automatic exposure control suffers from the long exposure stabilization time. The exposure stabilization time is the time it takes from a time when the camera starts shooting to a time when it adjusts to the optimal exposure. Too long exposure stabilization time means that the camera is unable to adapt to the rapid changes in the dynamic scene and may miss photography opportunities and beautiful moments, thereby affecting the user's shooting experience. Related exposure adjustment methods are mainly based on a selected exposure parameter value, and then gradually and iteratively converge to a target exposure parameter value by a comparison method, but this greatly increases the exposure stabilization time.

To this end, the present disclosure proposes various methods performed by the electronic apparatus to solve at least one of the above problems.

FIG. 1 is an example architectural diagram, according to an embodiment of the present disclosure.

According to an aspect of the present disclosure, it is proposed to utilize feature information given by a tone mapping module to assist an automatic exposure control module in the prediction of an image exposure parameter. The tone mapping module according to an embodiment of the present disclosure is closer to human perception, and the feature information provided by it can provide the automatic exposure module with a guidance on a parameter adjustment direction and degree, which is conducive to realizing faster, more accurate, and more stable prediction of the image exposure parameter, and thus is conducive to enable that the obtained image is kept brightness stable in the time dimension.

According to an aspect of the present disclosure, it is proposed to divide the tone mapping module into a tone mapping base adjustment module and a tone mapping fine-grained adjustment module, wherein the tone mapping base adjustment module may perform the tone mapping of the entire image for global color and brightness adjustments, and provides the result for generating a preview image in the preview mode, whereas the tone mapping fine-grained adjustment module, performs, on the basis of the tone mapping base adjustment module, the fine-grained adjustment on the image using the feature information associated with the tone mapping provided by the tone mapping base adjustment module, and this progressive relationship between the tone mapping base adjustment module and the tone mapping fine-grained adjustment module may make the preview image obtained in the preview mode consistent in color and brightness with the snapshot image obtained in the snapshot mode.

According to an aspect of the present disclosure, it is proposed that historical exposure information may be also considered when predicting the image exposure parameter of the current image, and the image exposure parameter may be predicted by the interaction of the historical exposure information with the image feature of the current frame. By considering the historical exposure information when predicting the image exposure parameter, it can help to predict the exposure parameter quickly and accurately. In addition, considering the historical exposure information when predicting the image exposure parameter may be also conducive to cope with complex lighting environments, for example, by considering both of the feature information associated with the tone mapping described above and the historical exposure information when predicting the image exposure parameter, it may predict the exposure parameter more accurately, which facilitates better coping with complex lighting environments.

As shown in FIG. 1, for example, light is converted into an electrical signal by the image sensor, and converted into single-channel raw image data, which may be processed respectively through two branches, and these two branches correspond to two shooting modes, the preview mode and the snapshot mode, respectively.

The raw image data in the preview mode, after being performed the simple image processing (e.g., demosaicing and denoising) in a first ISP (e.g., a hardware ISP), may be input into an image feature extraction module 110 (e.g., a convolutional neural module) for image feature extraction, and the extracted image feature may be respectively input into the tone mapping base adjustment module 130 and the automatic exposure control module 140. The tone mapping base adjustment module 130 may perform the tone mapping on the image based on the image feature, which mainly adjusts the global color and brightness, and the output result is used to obtain the preview image in the preview mode. The feature information (e.g., intermediate eigenvalues) associated with the tone mapping base adjustment module 130 performing the tone mapping may be also involved in the process of the image exposure parameter prediction, the implementation may be that, for example, the feature information provided by the tone mapping base adjustment module 130 may be converted into auxiliary information including at least one of exposure adjustment direction information and exposure adjustment amplitude information through a competitive decision module 150, and the interaction and prediction (interaction & prediction) module in the automatic exposure control module 140 may fuse the auxiliary information and the image feature to predict the image exposure parameter, or the automatic exposure control module 140 may further fuse the historical exposure information 103 (also referred to as a memory bank) on the basis of the auxiliary information and the image feature 101 to predict the image exposure parameter. Alternatively, the automatic exposure control module 140 may also predict the image exposure parameter based on both the image feature 101 and the historical exposure information 103. In the present disclosure, the exposure adjustment direction information is information about the exposure adjustment direction, and the exposure adjustment amplitude information is information about the exposure adjustment amplitude.

Processed image data may be obtained by a second ISP (e.g., a software ISP) on the raw image data in the snapshot mode, and this processed image data may be processed by the tone mapping fine-grained adjustment module 120, and the tone mapping fine-grained adjustment module 120 performs the fine-grained adjustment on the image obtained through the second ISP on the basis of the feature information 102 associated with the tone mapping provided by the tone mapping base adjustment module 130, which ensures that the result of the fine-grained adjustment is globally consistent with the result of the base adjustment, and the result of the fine-grained adjustment is displayed as the snapshot image 105 in the snapshot mode.

According to an embodiment, the image signal processing of the first ISP is faster and with lower latency than that of the second ISP, but the image processing quality of the second ISP is higher than that of the first ISP. For example, the ISP includes converting an optical signal to an electrical signal by a camera sensor, performing a camera defect correction on the electrical signal, performing a demosaicing process and a denoising process on the signal going through the camera defect correction, and further performing a white balance process, and performing the tone mapping on the white balance processed image to obtain an image that can be suitable for display by the target display apparatus. Operations included in the ISP and the execution order of each operation are not limited to the above examples. Both the hardware ISP and the software ISP include the operations described above, but the implementations of the two are different. The hardware ISP corresponds to the preview mode and may require faster image signal processing with lower latency. The software ISP corresponds to the snapshot mode and may require higher image quality, which may relax the requirement for latency. However, the objects processed by the hardware ISP and the software ISP may be both from the same camera sensor and share the same exposure parameter to ensure consistent exposure in the preview mode and the snapshot mode. The hardware ISP usually uses simpler image processing algorithms, and the image processing quality is lower compared to that of the software ISP. The software ISP usually uses more complex image processing algorithms, for example, image processing algorithms based on an artificial intelligence model, and thus, the image processing quality is higher but latency is longer than the hardware ISP.

Figure 2:
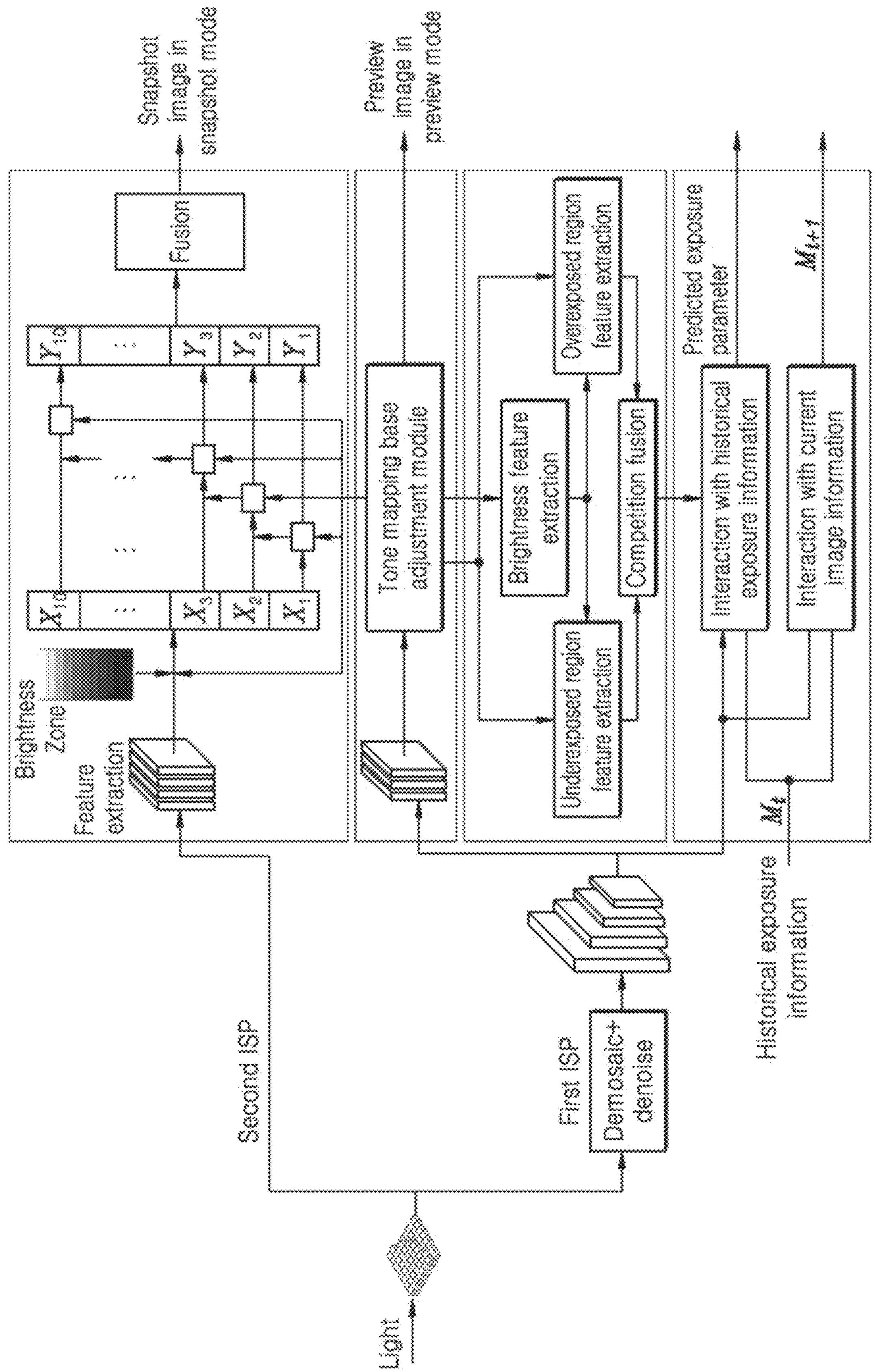
FIG. 2 is a schematic diagram illustrating an example architecture, according to an embodiment of the present disclosure.

FIG. 2 is a schematic diagram illustrating an example architecture, according to an embodiment of the present disclosure. Hereinafter, various aspects of the present disclosure and specific operations performed by the various modules illustrated in FIG. 2 will be described in the description of the method performed by an electronic apparatus according to an embodiment of the present disclosure.

Figure 3:
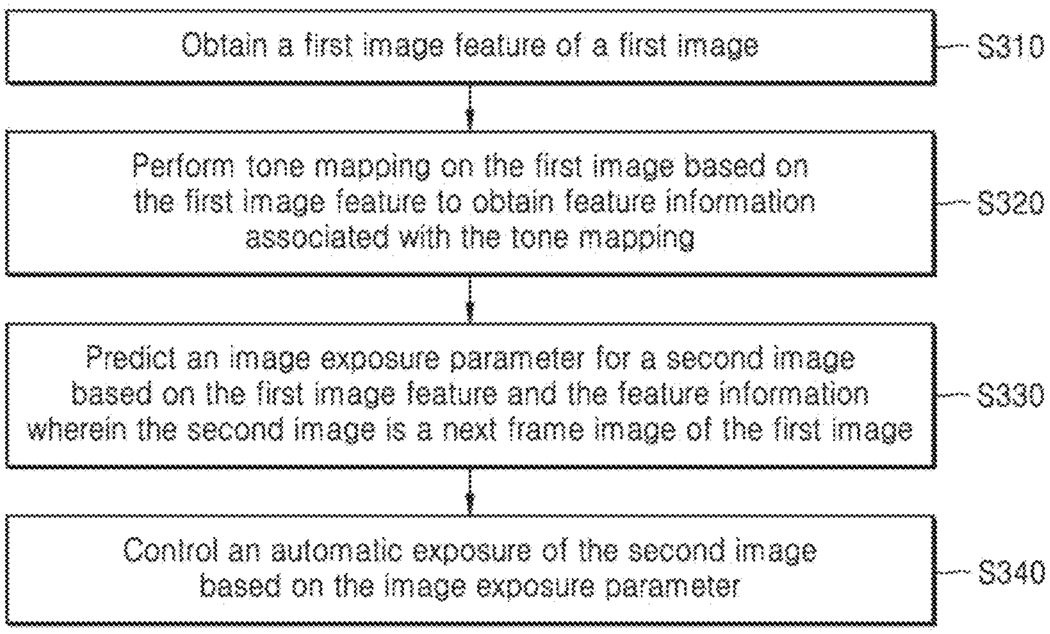
FIG. 3 is a flowchart illustrating a method performed by an electronic apparatus, according to an embodiment of the present disclosure.

FIG. 3 is a flowchart illustrating a method performed by an electronic apparatus according to an embodiment of the present disclosure.

Referring to FIG. 3, at step S310, a first image feature of a first image is obtained. For example, the first image may be a current image obtained by an image sensor utilizing a current image exposure parameter. According to an embodiment, for example, the first image feature may be an image feature obtained by performing a first ISP processing and performing image feature extraction on the image obtained by the image sensor. For example, the first ISP processing may include performing processes, such as demosaicing, denoising, and the like, on the first image, and the present disclosure does not limit the way of the first ISP processing. The data after the first ISP processing may be further input into a neural network for the feature extraction module 110, and the present disclosure does not have any limitation on the type of the neural network and the specific way of the feature extraction.

After obtaining the first image feature of the first image, at step S320, tone mapping is performed on the first image based on the first image feature to obtain feature information associated with the tone mapping.

Figure 4:
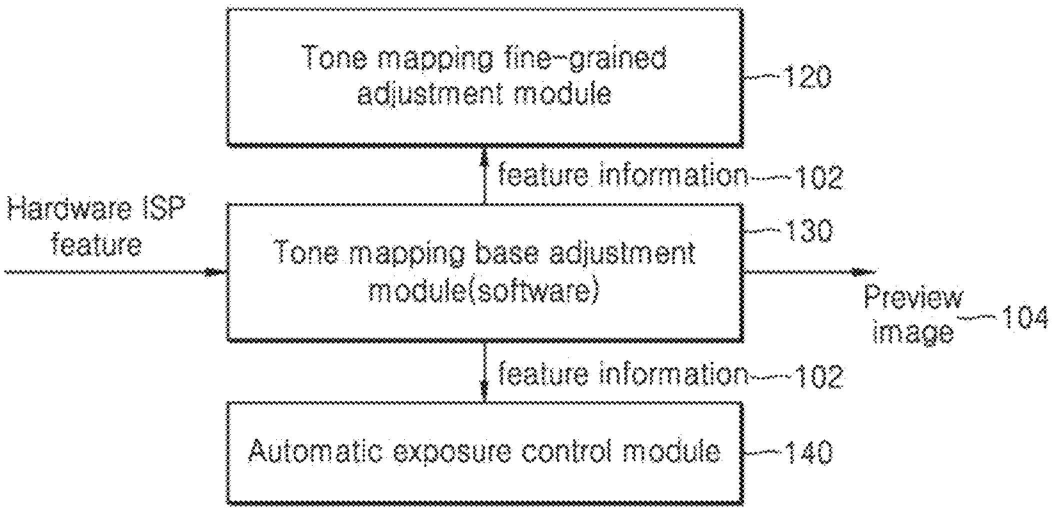
FIG. 4 is a schematic diagram illustrating a function of a tone mapping base adjustment module, according to an embodiment of the present disclosure.

According to an embodiment, alternatively, the performing of the tone mapping on the first image based on the first image feature to obtain the feature information associated with the tone mapping may include: obtaining a brightness statistical feature of the first image based on the first image feature; obtaining global features of the first image using a deep learning network, based on the first image feature, wherein the global features include brightness distribution information of the first image; obtaining the feature information based on the global features and the brightness statistical feature. For example, the above operations may be performed by the tone mapping base adjustment module described above. FIG. 4 is a schematic diagram illustrating a function of a tone mapping base adjustment module 130 according to an embodiment of the present disclosure.

As shown in FIG. 4, the tone mapping base adjustment module 130 may be used to perform the tone mapping on the first image so as to adjust the color and brightness of the first image, and make the adjustment result to be displayed in the preview mode as the preview image 104. The present disclosure designs a lightweight deep learning-based tone mapping base adjustment module 130 to ensure that it is capable of real-time deriving, which is used to calculate the adjustment result of the maximum capability achievable under a current input condition. When the input condition is ideal (proper light quantity input), the image with ideal brightness and color is obtained; when the input condition is not ideal (improper light quantity input, including over-input and under-input), the obtained image is also not ideal (overexposure or underexposure). In addition to this, the tone mapping base adjustment module 130 may be also responsible for providing the automatic exposure control module 140 with the feature information 102 associated with the tone mapping to assist in the prediction of the image exposure parameter. Further, the tone mapping base adjustment module 130 may be also responsible for providing the tone mapping fine-grained adjustment module 120 with the feature information 102 associated with the tone mapping to achieve consistency of the preview image 104 and the snapshot image.

Figure 5:
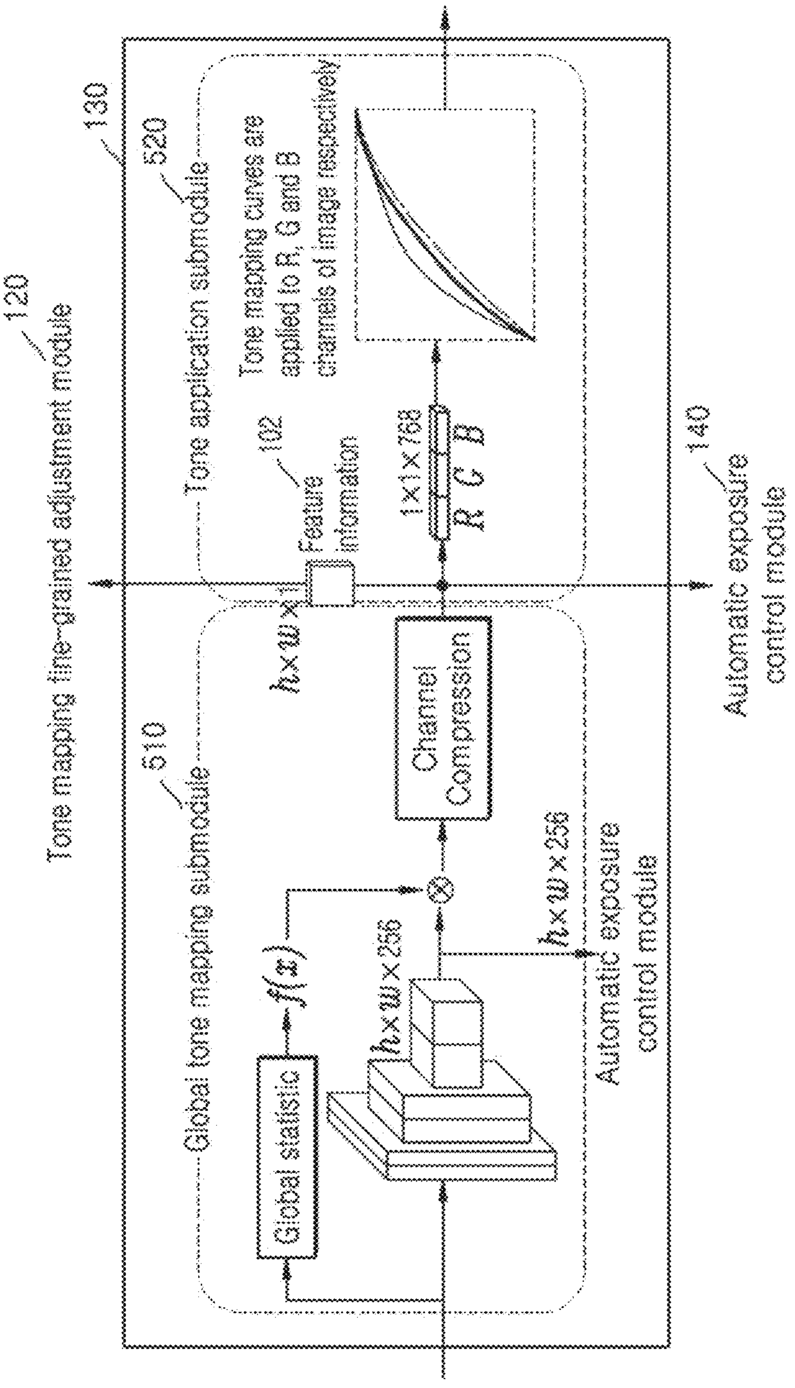
FIG. 5 is a schematic diagram illustrating operations of a tone mapping base adjustment module, according to an embodiment of the present disclosure.

FIG. 5 is a schematic diagram illustrating operations of a tone mapping base adjustment module 130 according to an embodiment of the present disclosure.

For example, as shown in FIG. 5, the tone mapping base adjustment module 130 may include two submodules, namely, a global tone mapping submodule 510 and a tone application submodule 520 respectively.

The global tone mapping submodule 510 may include two sub-branches. The first sub-branch may obtain the brightness statistical feature of the first image based on the first image feature, for example, the brightness statistical feature of the input first image feature may be calculated, for example, the brightness statistical feature may include a global average brightness. Afterwards, the brightness statistical feature may be mapped to a target range by a pre-set empirical function f(x), for example, f(x)=1+relu (0.4-mean) *0.25, wherein the mean is the average brightness of the first image, and the relu is a linear rectification function (also referred to as a modified linear unit), and is an activation function commonly used in the artificial neural network. The average brightness of the first image may be mapped to the target brightness by the function f(x). The second sub-branch utilizes the deep learning network to obtain global features of the first image, which may include the brightness distribution information of the first image. For example, the second sub-branch may perform convolution and downsampling on the first image feature of the first image for calculating correlation of each pixel feature with other pixel features within its receptive field, and perform the weighted adjustment on the pixel features based on the correlation to ultimately obtain the global features. For example, the size of the global feature block may be h×w×256, and these features may not only be used to obtain the feature information 102 mentioned above, but also may be feedback to the automatic exposure control module 140. Subsequently, the result of the second sub-branch is performed dot-product with the result of the first sub-branch, and further a weighted compression in a channel dimension may be performed on the image feature block obtained after the dot-product to obtain the feature information 102 associated with the tone mapping, for example, to obtain a weight map with a small scale and a shape of h×w×1 as the feature information 102. This weight map reflects the target brightness distribution of the first image at a coarser scale. This weight map will be input into the tone mapping fine-grained adjustment module 120 and the automatic exposure control module 140, respectively.

The tone application module 520 may perform a global pooling operation and a full connection operation on the small-scale image feature block output from the global tone mapping module 510, for example, to obtain 1×1×768 feature vectors which correspond to the tone mapping curves of the three channels R/G/B, respectively, and the first image may be adjusted by applying these mapping curves, to obtain the preview image 104 in the preview mode.

After the feature information associated with the tone mapping has been obtained at step S320, at step S330, an image exposure parameter for a second image may be predicted based on the first image feature and the feature information.

According to an embodiment, alternatively, step S330 may include obtaining auxiliary information for an exposure parameter prediction based on the feature information 102, wherein the auxiliary information includes at least one of exposure adjustment direction information and exposure adjustment magnitude information; predicting the image exposure parameter based on the auxiliary information and the first image feature. For example, the obtaining of the auxiliary information for the exposure parameter prediction based on the feature information 102 may be performed by the competitive decision module 150 in the automatic exposure control module 140 of FIG. 1. According to an embodiment, the auxiliary information may be obtained based on the global features and the feature information 102. The obtaining of the auxiliary information based on the global features and the feature information 102 may include: obtaining a brightness feature based on the feature information 102; determining an overexposed region and an underexposed region of the first image based on the obtained brightness feature; obtaining a first feature corresponding to the overexposed region and a second feature corresponding to the underexposed region based on the global features; and obtaining the auxiliary information based on the first feature and the second feature. For example, as shown in of FIG. 2, the tone mapping base adjustment module outputs the global features and the feature information to the competitive decision module. The competitive decision module may perform, based on these information, a brightness feature extraction, an overexposed region feature (first feature above) extraction, and an underexposed region feature (second feature above) extraction, respectively and fuses the underexposed region feature and the overexposed region feature to obtain the auxiliary information.

After predicting an image exposure parameter for a second image, at step S340, control an automatic exposure of the second image based on the image exposure parameter.

Figure 6:
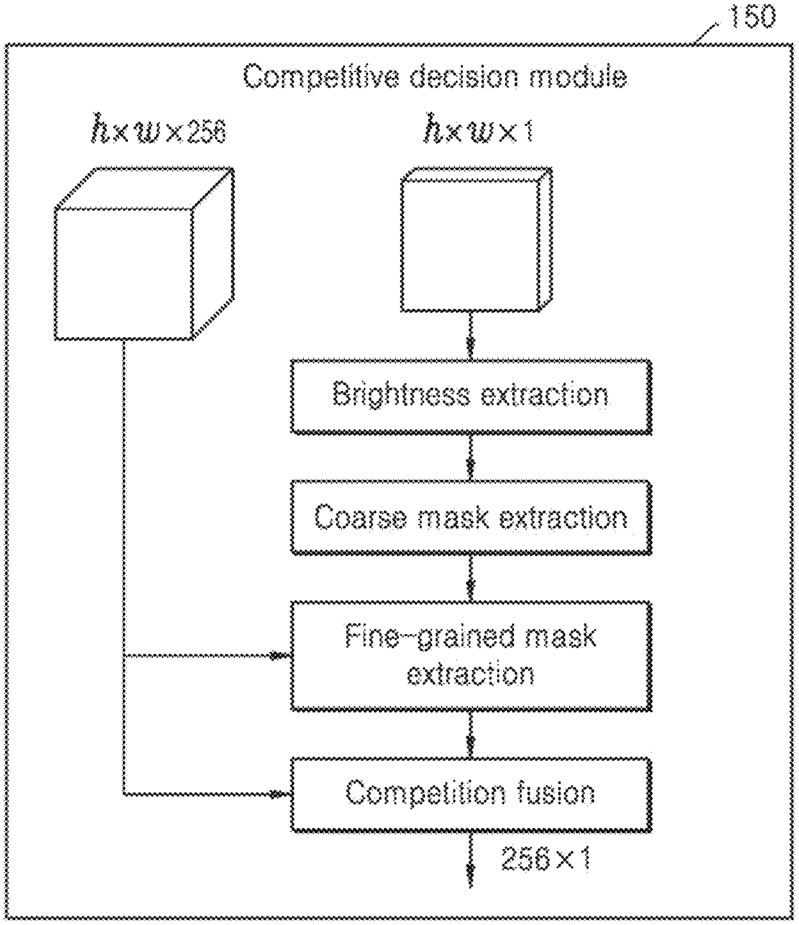
FIG. 6 is a schematic diagram illustrating a competitive decision module, according to an embodiment of the present disclosure.

FIG. 6 is a schematic diagram illustrating a competitive decision module 150 according to an embodiment of the present disclosure.

As described above, the tone mapping base adjustment module can perceive the distribution of the brightness of the image and perceive the overexposed region and the underexposed region of the image, so that the overexposed region and the underexposed region may be determined using the feature information associated with the tone mapping base adjustment module performing the tone mapping, and the auxiliary information for the exposure parameter prediction, for example, the exposure adjustment direction information and the exposure adjustment amplitude information, may be obtained based on the feature of the overexposed region and the feature of the underexposed region, and this information may be ultimately used as a reference for predicting the image exposure parameter. In order to obtain the auxiliary information, for example, as shown in FIG. 6, the competitive decision module 150 may sequentially perform the following four operations: a brightness extraction, a coarse mask extraction, a fine-grained mask extraction, and a competition fusion. These operations will be further described below with reference to FIG. 7.

Figure 7:
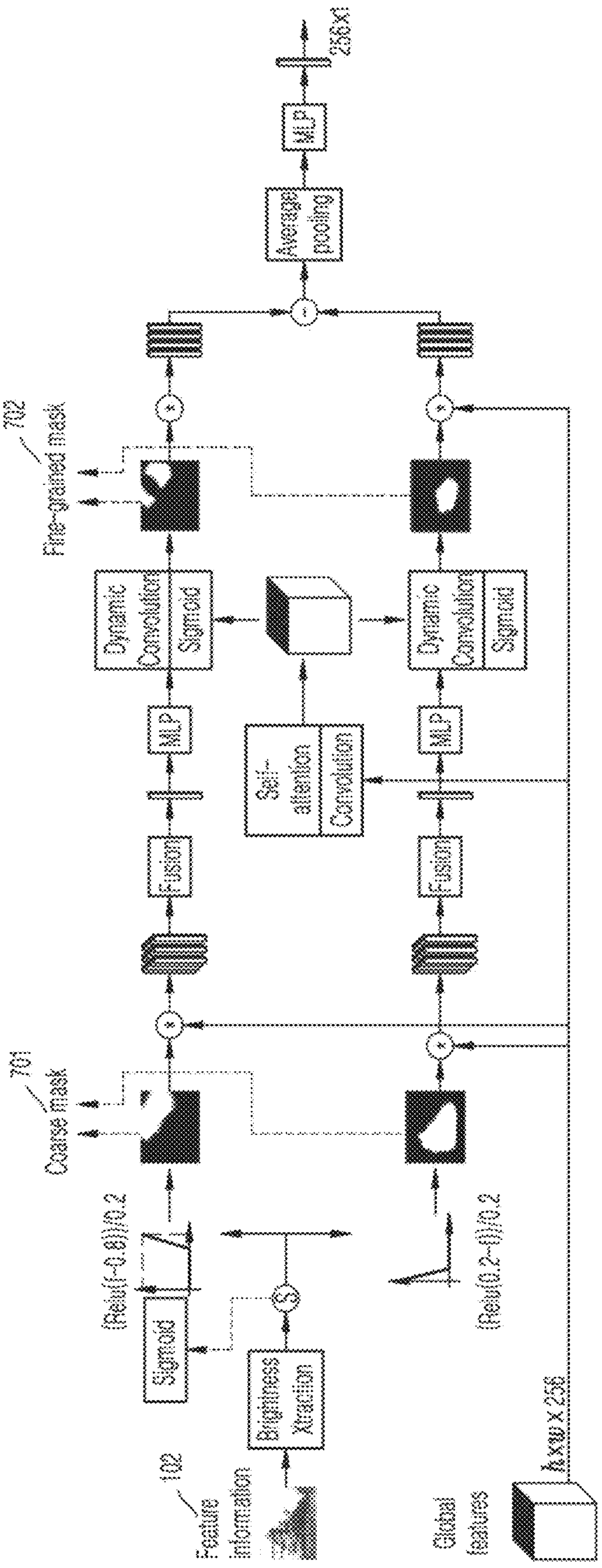
FIG. 7 is a schematic diagram illustrating detailed operations of a competitive decision module, according to an embodiment of the present disclosure.

FIG. 7 is a schematic diagram illustrating detailed operations of a competitive decision module according to an embodiment of the present disclosure.

As shown in FIG. 7, firstly, the brightness feature may be obtained based on the feature information 102 associated with the tone mapping provided by the tone mapping base adjustment module, for example, the brightness extraction may be performed using the h×w×1 feature map output by the tone mapping base adjustment module, the reason for using this feature map is that this feature map reflects the brightness distribution of the image.

Subsequently, the overexposed region and the underexposed region of the first image may be determined based on the obtained brightness feature. According to an embodiment, alternatively, the determining of the overexposed region and the underexposed region of the first image based on the obtained brightness feature may include: obtaining first mask information 701 (also referred to as "a coarse mask") corresponding to the overexposed region and the underexposed region based on the obtained brightness feature; obtaining a third feature corresponding to the overexposed region and a fourth feature corresponding to the underexposed region based on the global features and the first mask information; semantically enhancing on the global features using a self-attention mechanism; obtaining second mask information 702 (also referred to as "a fine-grained mask") corresponding to the overexposed region and the underexposed region based on the third feature, the fourth feature and the semantically enhanced global features. Accordingly, the obtaining of the first feature corresponding to the overexposed region and the second feature corresponding to the underexposed region based on the global features may include: obtaining the first feature and the second feature based on the global features and the second mask information.

As shown in FIG. 7, after the brightness feature being obtained, for example, a normalized brightness map is obtained by normalizing the brightness value with a Sigmoid function, wherein, in the normalized brightness map, 0 represents a pure black region and 1 represents a pure white region. Subsequently, the overexposed region and the underexposed region may be obtained on the normalized brightness map, and the extraction way may be, for example, designing two truncation functions f(x)=(Relu (x−0.8))/0.2 and f(x)=Relu (0.2−f)/0.2 on the basis of the Relu function, wherein the first function extracts the region with a value that is greater than 0.8 and less than 1 in the brightness map, and the second function extracts the region with a value that is greater than 0 and less than 0.2 in the brightness map, these two regions are the overexposed region and the underexposed region respectively, and this step completes the extraction of the first mask information 701 (i.e., the coarse mask) corresponding to the overexposed region and underexposed region, which enable the realization of coarse extraction of the overexposed region and the underexposed region. The truncation functions are not limited to the above design way, but may be designed in other ways according to different scenes.

Next, in order to more accurately determine the overexposed region and the underexposed region, firstly, the third feature corresponding to the overexposed region and the fourth feature corresponding to the underexposed region may be obtained based on the coarse masks 701 corresponding to the initially determined overexposed region and the underexposed region and the global features from the tone mapping base adjustment module, the implementation may be directly multiplying the coarse mask corresponding to the initially determined overexposed region and the coarse mask corresponding to the initially determined underexposed region with the global features, for example, directly multiplying the coarse masks 701 with the global features of h×w×256, whereby two sets of features may be obtained, the two sets of features corresponding to the overexposed region and the underexposed region, respectively. In addition, a fusion operation may further performed on the two sets of features, such as a weighted fusion, etc., respectively, to convert one set of feature values into one feature value of size 1*1*256, these two features (the third feature and the fourth feature above) represent the characteristics of the majority of the features in the region, that is, the overexposed feature and the underexposed feature, respectively. Subsequently, these two features may be mapped using a multilayer perceptron (MLP).

For the fine-grained extraction of the overexposed region and the underexposed region, and excluding the regions that do not semantically match the overexposure and underexposure, the global features (e.g., the features with a size of h×w×256 as described above) output from the tone mapping base adjustment module may be semantically enhanced by using the self-attention mechanism to obtain the semantically enhanced global features. Subsequently, features with a size of 1*1*256 after MLP mapping may be performed dynamic convolution on the semantically enhanced global features with a size of h*w*256, and the result of the convolution is normalized using the Sigmod function, which ultimately yields two masks with a size of h*w*1 (i.e., the second mask information mentioned above) corresponding to the fine-grained overexposed region and underexposed region, respectively.

After determining the fine-grained second mask information 702, the two sets of fine-grained masks may be used to obtain the features at corresponding positions in the global features output by the tone mapping base adjustment module, for example, the calculation way may be directly multiplying the two masks with a size of h*w*1 with the h*w*256 features output by the tone mapping base adjustment module, so as to obtain the two sets of features (i.e. the first feature and the second feature mentioned above) corresponding to the overexposed region and the underexposed region.

Finally, the auxiliary information may be obtained based on the first feature and the second feature. According to an embodiment, the auxiliary information may be obtained based on the difference between the first feature and the second feature. For example, average pooling may be performed on the difference after subtraction of the two sets of features, and then the multilayer perceptron may be performed on the average pooled result to predict and obtain the auxiliary information, and the size of the auxiliary information may be, for example, 256*1.

After obtaining the auxiliary information, the image exposure parameter may be predicted based on the auxiliary information and the first image feature.

According to an embodiment of the present disclosure, after acquiring the first image feature of the first image, the tone mapping may be performed on the first image based on the first image feature to obtain the feature information associated with the tone mapping, and the image exposure parameter of the second image is predicted based on the first image feature and the feature information, and since the feature information associated with the tone mapping of the first image is combined when predicting the image exposure parameter of the second image, and the tone mapping includes a brightness adjustment of the first image, the feature information is capable of reflecting the brightness distribution of the first image, and thus it is capable of predicting the image exposure parameter more accurately by the combination of the feature information, thereby facilitating the obtaining of a higher quality image using the predicted image exposure parameter. Because it is possible to predict the image exposure parameter of the second image based on the first image feature and the feature information, instead of using the related method that requires gradual convergence to the target exposure parameter value through constant comparison based on the selected exposure parameter value, it is also objectively possible to shorten the exposure stabilization time, thereby the shooting experience of the user is improved. For example, when shooting an actual scene, adopting the above-described automatic exposure control according to an embodiment of the present disclosure not only can ensure that the image is kept brightness stable in the time dimension, but also allows the image to be obtained within a shorter time.

According to an embodiment of the present disclosure, alternatively, the method described in FIG. 3 further include: acquiring historical exposure information 103 associated with the first image. For example, the pre-stored historical exposure information 103 may be read from a memory. In the case that the historical exposure information 103 is obtained, the above method of the predicting of the image exposure parameter based on the auxiliary information and the first image may include: predicting the image exposure parameter based on the auxiliary information, the first image feature 101, and the historical exposure information 103. Since the image exposure parameter may be predicted by further combining the historical exposure information 103 on the basis of the auxiliary information and the first image feature 101, the accuracy of the image exposure parameter prediction may be further improved, thereby facilitating the obtaining of a higher quality image, and also facilitating the rapid prediction of the exposure parameter, shortening the exposure stabilization time, and improving the shooting experience of the user.

According to an embodiment, the predicting of the image exposure parameter based on the auxiliary information, the first image feature 101, and the historical exposure information 103 may include: determining respective fusion ratios of the auxiliary information and the historical exposure information 103 when used for predicting the image exposure parameter, based on the historical exposure information 103; predicting the image exposure parameter by fusing, according to the fusion ratios, the first image feature 101, the auxiliary information and the historical exposure information 103. For example, according to the respective fusion ratios of the auxiliary information and the historical exposure information, the auxiliary information and the historical exposure information 103 corresponding to the fusion ratios, together with the first image feature, are input into the pre-trained machine learning model to predict the image exposure parameter.

In order to obtain a more accurate and stable exposure parameter prediction, according to an embodiment of the present disclosure, the respective fusion ratios of the auxiliary information and the historical exposure information 103 when used for predicting the image exposure parameter is determined, and by using the auxiliary information and the historical exposure information 103 according to the determined fusion ratios, it is possible to better cope with more complex lighting scene. For example, for a rapidly changing lighting scene, the tone mapping base adjustment module 130 may tend to suppress the magnitude of brightness change of the image, which results in the exposure parameter not faithfully reflecting the current brightness of the scene, so that fusing the historical exposure information 103 to perform the image exposure parameter prediction helps to better cope with complex scenes.

Figure 8:
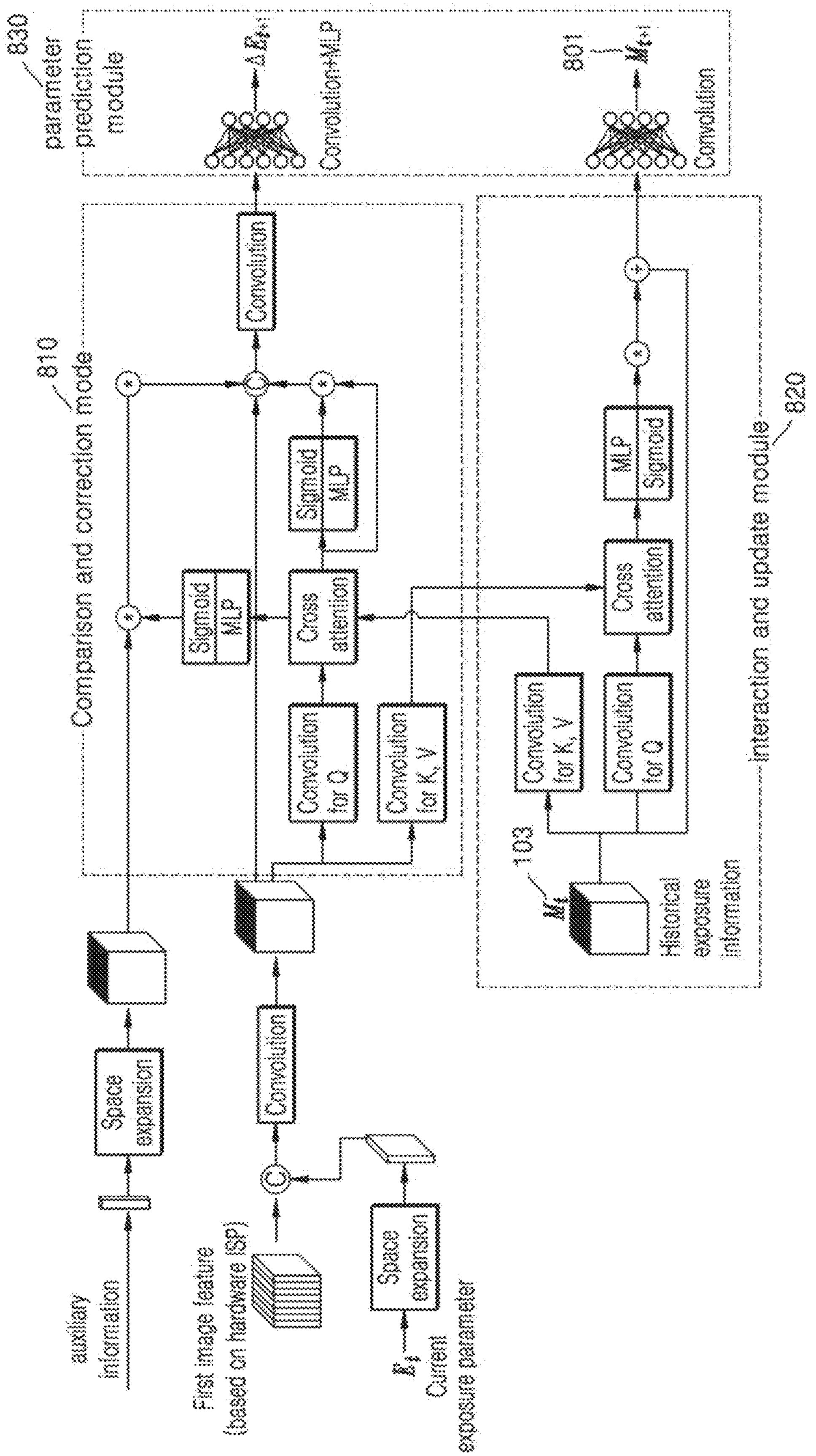
FIG. 8 is a schematic diagram illustrating operations of an interaction and prediction module, according to an embodiment of the present disclosure.

The above operation of predicting the image exposure parameter may be performed by the interaction and prediction module of FIG. 1. FIG. 8 is a schematic diagram illustrating operations of the interaction and prediction module 160 according to an embodiment of the present disclosure.

As shown in FIG. 8, in order to determine the respective fusion ratios of the auxiliary information and the historical exposure information when used predicting the image exposure parameter, firstly, first image information is obtained based on the first image feature and exposure parameter information of the first image, and then, the fusion ratios may be determined based on the correlation relationship between the first image information and the historical exposure information.

According to an embodiment, as shown in FIGS. 1, the automatic exposure control module 140 and the tone mapping base adjustment module 130 may share the image feature extraction network, and the first image feature 101 which is obtained by the feature extraction module 110 based on the image data processed by the first ISP may be input into the interaction and prediction module 160 of the automatic exposure control module 140. As shown in of FIG. 2, the interaction and prediction module predicts the image exposure parameter by interacting with the historical exposure information and fusing the auxiliary information from the competitive decision module and the historical exposure information on the basis of the first image feature. For example, as shown in FIG. 8, the interaction and prediction module may include three sub-modules: a comparison and correction module 810, an interaction and update module 820, and a parameter prediction module 830.

According to an embodiment, the first image feature obtained based on the first ISP may include only the image feature information of the first image and may not include the image exposure parameter information. According to an embodiment, as shown in FIG. 8, the exposure parameter information of the first image (i.e., the current exposure parameter, $E_t$ in FIG. 8) may be first spatially expanded such that it is consistent in spatial size with the size of the first image feature, and the information of the two may be superimposed to obtain the first image information (i.e., the current image information), and then the first image information is mapped by the convolution operation to obtain the corresponding Q value, K value and V value. In addition, the auxiliary information from the competitive decision module may also be spatially expanded such that it is consistent in spatial size with the size of the first image feature.

In order to predict the accurate image exposure parameter reflecting the brightness of the current scene and to make the predicted parameter more stable, according to an embodiment, the historical exposure information 103 may be saved and the correlation relationship between the first image information and the historical exposure information 103 may be calculated using a cross-attention, and the respective fusion ratios of the auxiliary information and the historical exposure information 103 when performing the exposure parameter prediction, may be determined based on the correlation relationship between the first image information and the historical exposure information. For example, a convolution may be performed on the Q value corresponding to the first image information, a convolution may be performed on the K value and the V value obtained by mapping the historical exposure information 103 ($M_t$ in FIG. 8), and a correlation between them may be calculated using the cross-attention, and information related to the current image information may be obtained from the historical exposure information 103 based on the correlation, and according to the related information, a correlation coefficient may be predicted using a multilayer perceptron with the Sigmoid function (it can also be predicted in other ways), the correlation coefficient may be used to determine the fusion ratio corresponding to each of the auxiliary information and the historical exposure information 103. For example, when the surrounding lighting scene suddenly changes drastically, the tone mapping base adjustment module tends to suppress such changes, and therefore it may be necessary to reduce the ratio of the auxiliary information obtained based on the feature information given by the tone mapping base adjustment module as well as the ratio of the historical exposure information when predicting the image exposure parameter. In addition to this, under normal circumstances, since the correlation between the current image information and the historical exposure information also indicates the changes of the image content and brightness, and the correlation is larger when the changes are smaller, fusing the historical exposure information to predict the image exposure parameter is conducive to obtain the stable and continuous exposure parameter. For example, when the changes are smaller, the respective fusion ratios of the auxiliary information and the historical exposure information may be increased.

After determining the respective fusion ratios of the auxiliary information and the historical exposure information 103, the auxiliary information and the historical exposure information 103 may be multiplied with their corresponding fusion ratios, and the multiplication results may be further fused with the first image information, and the final fusion results may be inputted into the parameter prediction module 830 after performing a convolution operation, and the updated value ($\Delta E_{t+1}$ in FIG. 8)) of the exposure parameter may be obtained after further convolution and MLP, and the final predicted image exposure parameter may be obtained by adding $\Delta E_{t+1}$ with $E_t$. The image exposure may be controlled, using the predicted image exposure parameter, to obtain the second image. For example, the second image may be a next frame image of the first image.

According to an embodiment, the correlation relationship between the first image information and the historical exposure information may be used to update the historical exposure information, in addition to determining the respective fusion ratios of the auxiliary information and the historical exposure information. For example, alternatively, the method described in FIG. 3 may further include: updating the historical exposure information using the exposure parameter information of the first image, based on the correlation relationship between the first image information and the historical exposure information, wherein the first image information is obtained based on the first image feature and the exposure parameter information of the first image. For example, as shown in in FIG. 2, the interaction and prediction module may update the historical exposure information $M_t$ by interacting with the current image information to obtain $M_{t+1}$. For example, as shown in FIG. 8, the interaction and update module 820 may perform a convolution on the Q value corresponding to the historical exposure information 103, and perform the cross-attention operation on the result of the convolution and the result of performing a convolution on the K value and the V value corresponding to the first image information, calculate the correlation between the first image information and the historical exposure information 103, and obtain, based on the correlation, corresponding information for inputting to the MLP and the Sigmoid to acquire the correlation coefficient, and control, based on the correlation coefficient, the ratio of the current exposure parameter fusing into the historical exposure information 103, and add the result of multiplying the ratio by the current exposure parameter to the historical exposure information 103, and finally, input the result of the adding into the parameter prediction module 830 to perform a further convolution operation, to obtain the final updated historical exposure information 801 ($M_{t+1}$ in FIG. 8). Alternatively, the updated historical exposure information 801 may be used when performing the next prediction of the image exposure parameter.

According to an embodiment of the present disclosure, since the prediction of the image exposure parameter may be performed by further combining the historical exposure information 103 on the basis of the auxiliary information, not only it is possible to predict the image exposure parameter more accurately, but also it is possible to cope with more complex scene changes, which is conducive to obtaining a higher-quality image, and furthermore, because it is possible to predict the image exposure parameter more accurately, it may not be required to perform redundant iterations to obtain the image exposure, and thus, it also facilitates fast prediction of the exposure parameter, shortens the exposure stabilization time, and improves the shooting experience of the user.

As mentioned above, since the preview mode and the snapshot mode utilize different ISP pipelines, the different ISP pipelines contain different the tone mapping modules, and the differences of the tone mapping modules in the two pipelines lead to differences in the image effects of the preview mode and the snapshot mode in terms of color and brightness, and thus inconsistency between the preview image obtained in the preview mode and the snapshot image obtained in the snapshot mode occurs. As to this, the present disclosure proposes to divide the tone mapping module into a tone mapping base adjustment module and a tone mapping fine-grained adjustment module, wherein the tone mapping base adjustment module performs the tone mapping on the entire image for global color and brightness adjustment, and provides the result for generating a preview image in the preview mode, while the tone mapping fine-grained adjustment module, on the basis of the tone mapping base adjustment module, performs the fine-grained adjustment on the image using the feature information associated with the tone mapping provided by the tone mapping base adjustment module, and this progressive relationship between them may make the preview image obtained in the preview mode consistent in color and brightness with the snapshot image obtained in the snapshot mode. Alternatively, according to an embodiment of the present disclosure, after performing the tone mapping on the first image based on the first image feature to obtain the feature information associated with the tone mapping, the method shown in FIG. 3 may further include: obtaining a preview image based on the tone mapping, wherein the first image feature is obtained through performing feature extraction on an image obtained by a first ISP on the first image, the tone mapping comprising performing the tone mapping on the image obtained by the first ISP on the first image; and/or acquiring a second image feature of the first image, and obtaining a snapshot image by adjusting, based on the second image feature and the feature information, an image obtained by a second ISP on the first image, wherein the second image feature is obtained through performing the feature extraction on the image obtained by the second ISP on the first image.

The tone mapping base adjustment module performing the tone mapping to obtain a preview image has been described above with reference to FIG. 5 and will not be repeated here. Next, how to obtain a snapshot image will be described in detail with reference to FIGS. 9 to 12.

Figure 9:
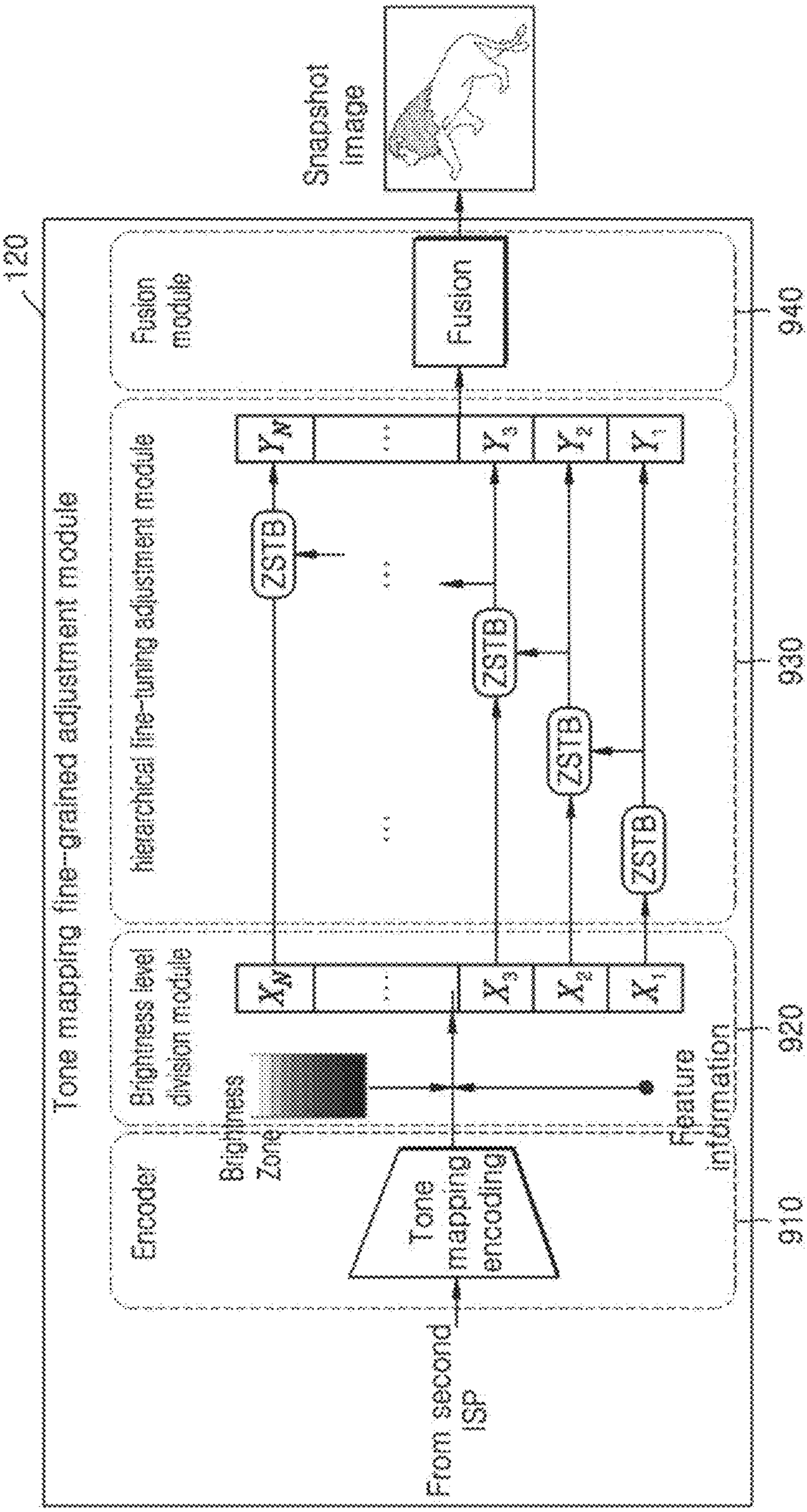
FIG. 9 is a schematic diagram illustrating operations of a tone mapping fine-grained adjustment module, according to an embodiment of the present disclosure.

FIG. 9 is a schematic diagram illustrating operations of a tone mapping fine-grained adjustment module 120 according to an embodiment of the present disclosure.

For example, the tone mapping fine-grained adjustment module 120 may include four modules: an encoder 910, a brightness level division module 920, a hierarchical fine-tuning adjustment module 930, and a fusion module 940.

As shown in FIG. 9, the input of the tone mapping fine-grained adjustment module 120 comes from the second ISP, and the image obtained based on the second ISP may be completely different from the image obtained from the first ISP in terms of data distribution, so the tone mapping encoder 910 may be applied to re-encode the image obtained based on the second ISP to obtain a new encoded feature (i.e., the second image feature as described above). Subsequently, a snapshot image may be obtained by adjusting, based on the second image feature and the feature information, an image obtained by the second ISP on the first image.

According to an embodiment, the obtaining of the snapshot image by adjusting, based on the second image feature and the feature information, the image obtained by the second ISP on the first image may include: performing a brightness level division of the first image based on the feature information; obtaining a feature map corresponding to each of divided brightness levels based on the second image feature; for each of the divided brightness levels, obtaining the snapshot image by adjusting, based on the feature map corresponding to the brightness level, pixel features within a range of the brightness level in the image obtained by the second ISP on the first image.

According to an embodiment, an interleaving brightness level division may be performed based on the feature information and a predetermined brightness level division, wherein adjacent brightness levels in the predetermined brightness level division may be merged as one interleaving brightness level in the interleaving brightness level division.

Figure 10:
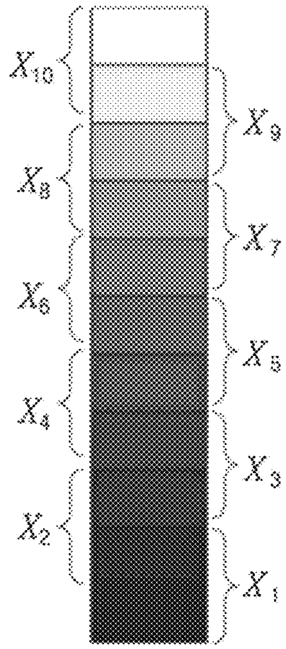
FIG. 10 is a schematic diagram illustrating an interleaving level division, according to an embodiment of the present disclosure.

FIG. 10 is a schematic diagram illustrating an interleaving level division according to an embodiment of the present disclosure. For example, the way of the predetermined brightness level division may be dividing the brightness into 10 levels, if 0 represents the darkest and 1 represents the brightest, and then the first level represents a range of 0~0.1, the second level represents a range of 0.1~0.2, and so on. The interleaving level division refers to merging adjacent brightness levels as one level in interleaving level division, and taking 10 levels as an example, the first level of the interleaving level division, X1, represents the merging of 0~0.1 and 0.1~0.2 (i.e., a range of 0~0.2), X2 represents the merging of 0.1~0.2 and 0.2~0.3 (i.e., a range of 0.1~0.3), X3 represents the merging of 0.2~0.3 and 0.3~0.4 (i.e., a range of 0.2~0.4), X4 represents the merging of 0.3~0.4 and 0.4~0.5 (i.e., a range of 0.3~0.5), X5 represents the merging of 0.4~0.5 and 0.5~0.6 (i.e., a range of 0.4~0.6) . . . and so on. As an example, the feature information from the tone mapping base adjustment module may be a global brightness weight map (the h×w×1 weight map mentioned above), based on which the interleaving brightness level division may be performed. For example, the global brightness weight map may be upsampled, using a nearest neighbor interpolation method, to the same scale as the feature map of the second image feature obtained through the encoder, and based on the value of the upsampled global brightness weight map, a mask of the corresponding level is determined according to the interleaving brightness level division method, wherein in the mask, values of a region for which values of the global brightness weight map are located within the range of the interleaving brightness level are 1, and values of other regions are 0, thereby each of the divided interleaving brightness levels is determined. Subsequently, the feature map corresponding to each of the divided interleaving brightness levels may be obtained based on the second image feature and the interleaving brightness levels. For example, the feature map corresponding to each of the interleaving brightness levels is obtained by using the mask to perform a dot-product with the second image feature obtained through the encoder and to perform a dot-product with the upsampled global brightness weight map, respectively, and superimposing the results of the dot-product in the channel dimension.

After obtaining the feature map corresponding to each of the interleaving brightness levels, for each of the interleaving brightness levels, adjusting the pixel features within the range of the interleaving brightness level based on the feature map corresponding to the interleaving brightness level and the feature map corresponding to a higher brightness level included in a lower interleaving brightness level adjacent to the interleaving brightness level; obtaining the snapshot image based on the adjusted pixel features within the range of each of the interleaving brightness levels. For example, this operation may be performed by the hierarchical fine-tuning adjustment module 930. As shown in FIG. 9, a separate adjustment branch may be designed for each interleaving level, which adjusts only the pixel features within the range of this interleaving level. Specifically, a ZSTB may be designed for each interleaving brightness level, which takes each pixel feature as a query, searches for pixel features related to it on and only on all pixel features within the range of the interleaving level and calculates the related weights, and finally updates its own pixel features. In the following, the operations of the ZSTB 1110 are described with reference to FIG. 11A, FIG. 11B and FIG. 11C.

Figure 11A:
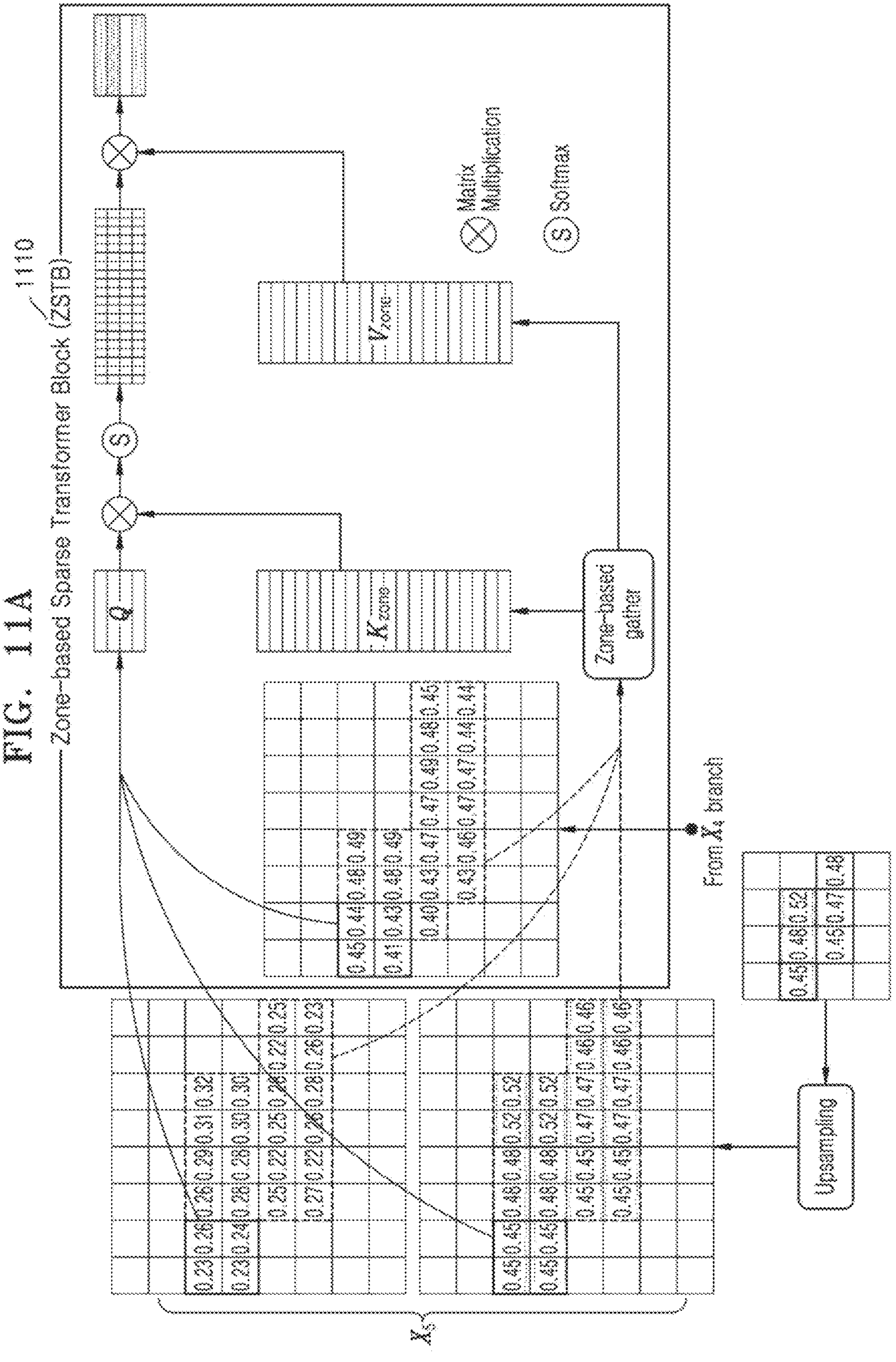
FIG. 11A is a schematic diagram illustrating operations of a zone based sparse transformer block (ZSTB), according to an embodiment of the present disclosure.
Figure 11B:
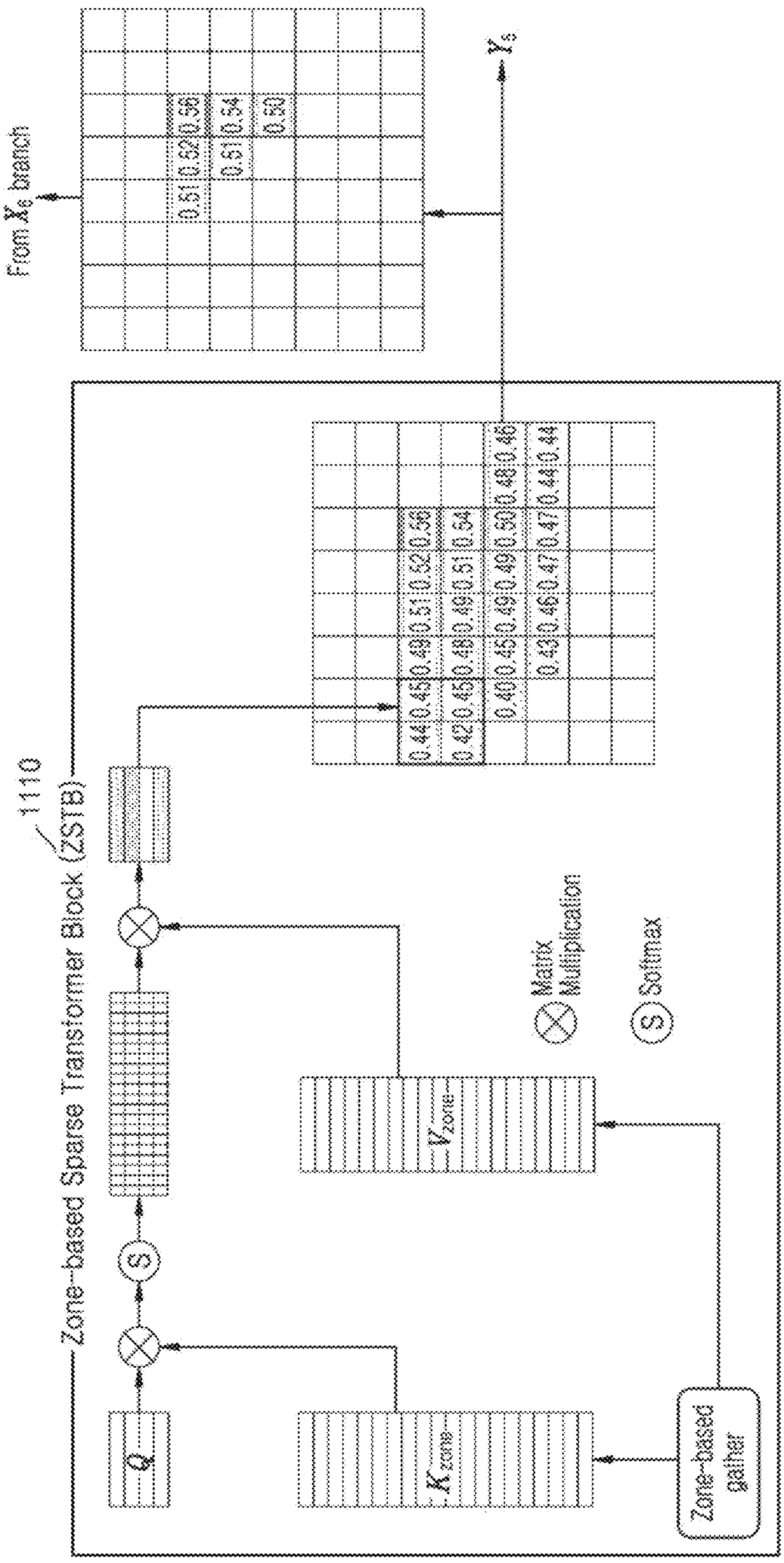
FIG. 11B is a schematic diagram illustrating operations of a zone based sparse transformer block (ZSTB), according to an embodiment of the present disclosure.

FIG. 11A is a schematic diagram illustrating operations of the ZSTB 1110 according to an embodiment of the present disclosure. As shown in FIG. 11A, for the ZSTB 1110 corresponding to each of the interleaving brightness levels, the inputs thereof are: the feature map corresponding to this interleaving brightness level and the feature map corresponding to a higher brightness level included in a lower interleaving brightness level adjacent to the interleaving brightness level. As described above, the feature map corresponding to this interleaving brightness level may be obtained based on the mask corresponding to this interleaving brightness level and the second image feature and the upsampled global brightness weight map above. According to an embodiment, the feature map corresponding to the higher brightness level included in the lower interleaving brightness level adjacent to this interleaving brightness level is a subset of the output of the ZSTB 1110 on the lower branch. For example, assuming that the lower interleaving brightness level is X4, and as in the example above, assuming that it is the merging of 0.3~0.4 and 0.4~0.5 in the predetermined brightness level division (i.e., a range of 0.3~0.5), the subset of the output of the ZSTB 1110 on the lower branch is the feature map corresponding to the higher brightness level 0.4~0.5. For example, in FIG. 10, the operations of the ZSTB are illustrated by taking the example that the ZSTB is a ZSTB corresponding to the fifth interleaving brightness level X5. As shown in FIG. 10, the inputs to the ZSTB corresponding to the fifth interleaving brightness level X5 (e.g., in a range of 0.4~0.6) are the feature map corresponding to X5 and the feature map corresponding to the higher brightness level in the X4 level (e.g., in a range of 0.4~0.5). After obtaining the feature maps described above, the ZSTB 1110 corresponding to the fifth interleaving brightness level X5 adjusts the pixel features in the range of this interleaving brightness level based on the feature maps described above. For example, the ZSTB 1110 is a variant of the standard transformer block, with the main difference that the ZSTB 1110 in the present disclosure establishes key-value pairs (denoted as Kzone and Vzone in FIG. 11A and FIG. 11B) only for pixel features corresponding to this interleaving brightness level, which is mainly realized by a zone-based gather operation. For example, the ZSTB 1110 gathers the pixel features corresponding to the dashed line box in the feature map input into the ZSTB 1110 to obtain the Kzone, and gathers the pixel features corresponding to the solid line box and the pixel features corresponding to the dashed line box in the feature map input into the ZSTB 1110 to obtain the Vzone, then the ZSTB 1110 obtains the weight of each pixel feature by performing matrix multiplication of the pixel features corresponding to the solid line box in the feature map input into the ZSTB 1110, as Q, with the Kzone and making the result go through the softmax, and finally obtains the adjusted pixel features corresponding to the solid line box by performing matrix multiplication of the obtained weight with the Vzone. As shown in FIG. 11B, after the calculation as described above is performed for each pixel feature, the adjusted feature map corresponding to the range of each of the interleaving brightness levels may be obtained. For example, the adjusted feature map Y5 corresponding to X5 may be obtained. Since a brightness interleaving level provide an implied mask of valid pixel features, it may be realized that only pixel features within the range of the interleaving level may be gathered and modeled, based on this mask, which may avoid the interference of other non-adjacent brightness levels, and effectively improve the computational efficiency.

Figure 11C:
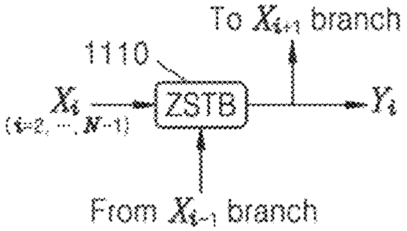
FIG. 11C is a schematic diagram illustrating operations of a zone based sparse transformer block (ZSTB), according to an embodiment of the present disclosure.

In addition, the ZSTB 1110 not only outputs the result of the branch of the current interleaving brightness level, but also separates a subset to be fed back to the branch of the higher interleaving brightness level, the subset corresponds to the feature map corresponding to the higher brightness level in the current interleaving brightness level. As shown in FIG. 11C, for each of the interleaving brightness levels $X_i$ (i=2, . . . , N−1, wherein N is the number of divided interleaving brightness levels), the ZSTB corresponding to $X_i$ outputs a corresponding result $Y_i$ based on the feature map corresponding to $X_i$ and the feature map fed back from the branch of $X_{i-1}$, and separates the feature map corresponding to the higher brightness level included in $X_i$ from $Y_i$ to be fed back to the branch of $X_{i+1}$. For example, the branch based on the interleaving brightness level X5 outputs the result Y5, and since this interleaving brightness level X5 is formed by merging the lower brightness level 0.4~0.5 and the higher brightness level 0.5~0.6, the higher brightness level corresponds to the range of 0.5~0.6, and pixel features corresponding to this range are separated as feedback to the branch of the interleaving brightness level X6. This feedback is essentially a modulation of the current brightness level to the higher brightness level, and reflects the effect of the current brightness level on the higher brightness level.

The hierarchical progressive fine-tuning tone adjustment scheme described above according to an embodiment of the present disclosure is based on the assumption that the current brightness level is closely related to and interacts with adjacent brightness levels, and is less affected by more distant brightness levels, which is consistent with subjective perception of human. For example, a lamp in the darker scene may generate overexposed regions mainly distributed around the lamp, that is, the brightness level of the lamp is mainly associated with the adjacent brightness levels (distributed around the lamp). Thus, the hierarchical progressive fine-tuning tone adjustment scheme may have advantages that 1) the degree of influence is calculated for the pixel features corresponding to each of the brightness levels only with the pixel features of its adjacent brightness levels and is utilized, which avoids the interference of the brightness levels that are far away from it, and 2) the ZSTB performs the long-range modeling only in a limited (and helpful) zone, which requires less computational resources and has higher efficiency in modeling.

Figure 12:
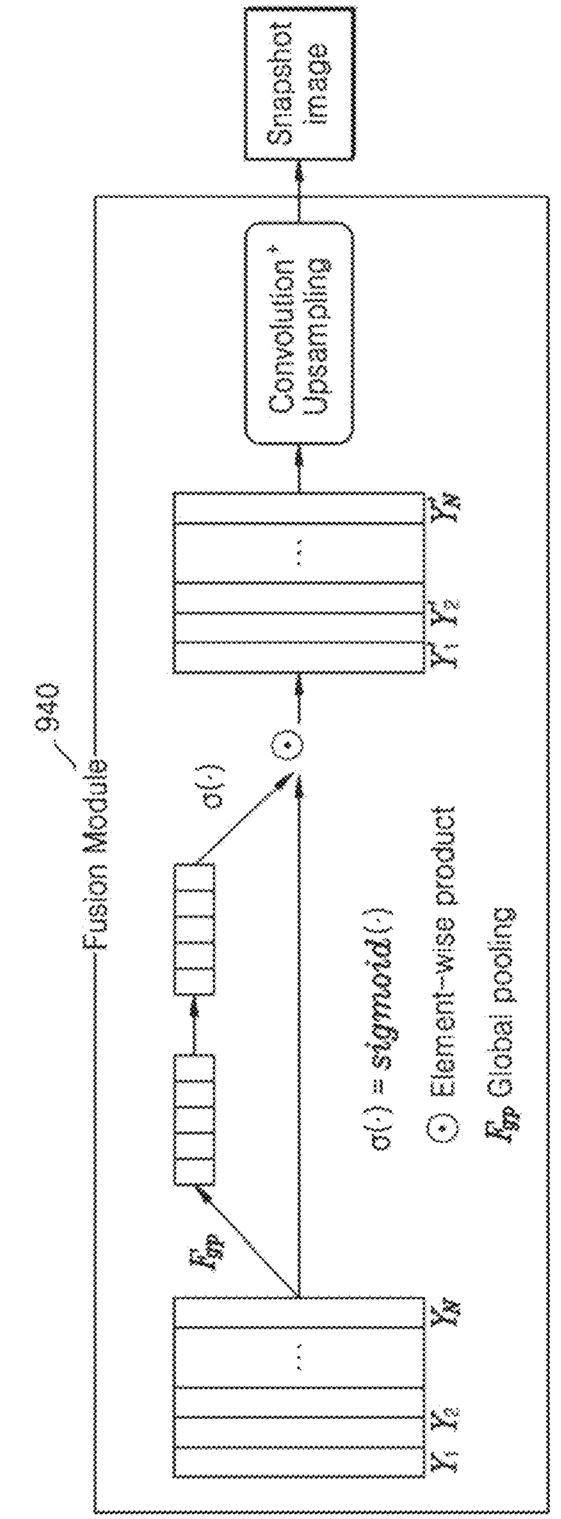
FIG. 12 is a schematic diagram illustrating operations of a fusion module in a tone mapping fine-grained adjustment module, according to an embodiment of the present disclosure.

After adjusting the pixel features within the range of each of the interleaving brightness levels in the way described above, the snapshot image may be obtained based on the adjusted pixel features within the range of the each of the interleaving brightness levels. This operation may be performed by the fusion module 940 in FIG. 9. FIG. 12 is a schematic diagram illustrating operations of a fusion module 940 in a tone mapping fine-grained adjustment module according to an embodiment of the present disclosure.

For example, as shown in FIG. 12, the fusion module 940 fuses the results of the branch of the each interleaving level undergone fine-grained adjustment, and a variety of fusion strategies may be adopted, for example, a channel-attention operation may be used to fuse the adjusted pixel features in the range of each of the interleaving brightness levels. The fusion method includes globally pooling the output results (Y1, Y2 . . . YN) corresponding to the range of each of the interleaving brightness level, and calculating the respective corresponding weights using the Sigmoid, and obtaining $Y_1'$, $Y_2'$ . . . $Y_N'$ by multiplying Y1, Y2 . . . YN with the corresponding weights, respectively. In the above operations, the weights of the eigenvalues in each interleaving brightness level at each pixel position may be calculated, and the adjusted pixel eigenvalues may be calculated by multiplying and weighting the weights with the corresponding eigenvalues. Finally, $Y_1'$, $Y_2'$ . . . $Y_N'$ are convolved and upsampled to obtain the final snapshot image. The main function of the fusion module 940 is to realize smooth transition between the brightness levels.

Figure 13:
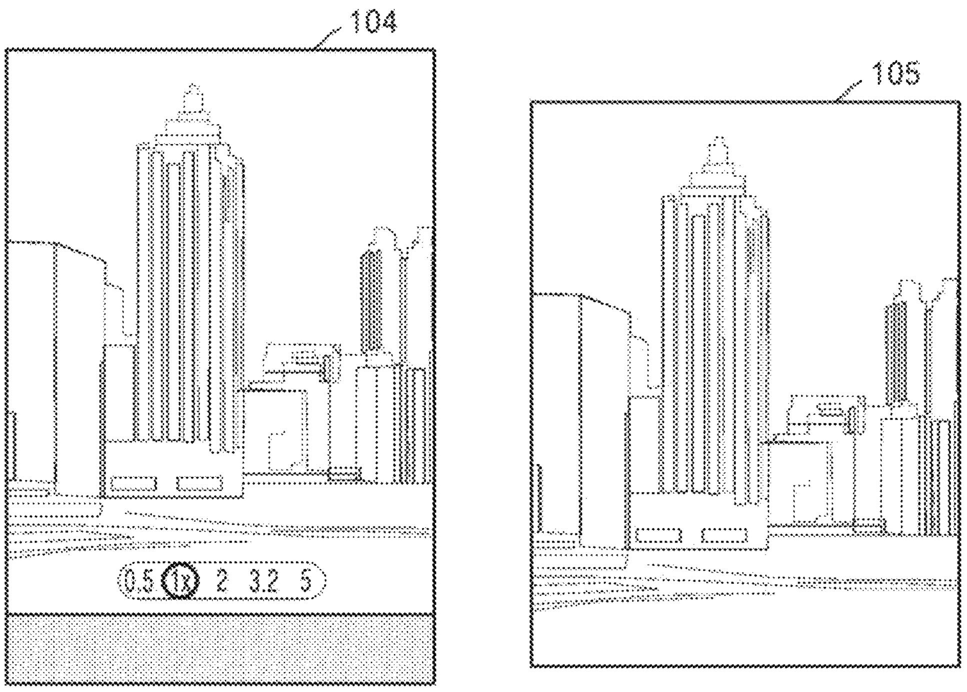
FIG. 13 is a schematic diagram illustrating visual effects of a preview image and a snapshot image, according to an embodiment of the present disclosure.

The way of obtaining the snapshot image according to an embodiment of the present disclosure is adopted such that the snapshot image may be consistent with the preview image. FIG. 13 is a schematic diagram illustrating visual effects of a preview image 104 and a snapshot image 105 according to an embodiment of the present disclosure. As shown in FIG. 13, the left image is a preview image 104 obtained in the preview mode, and the right image is a snapshot image 105 obtained in the snapshot mode, which are substantially consistent in terms of visual effects (e.g., color and brightness).

A method performed by an electronic apparatus according to one aspect of embodiments of the present disclosure has been described above in conjunction with FIGS. 1 to 13. The following description of a method performed by an electronic apparatus according to other aspects of embodiments of the present disclosure will be continued with reference to FIG. 14 and FIG. 15.

Figure 14:
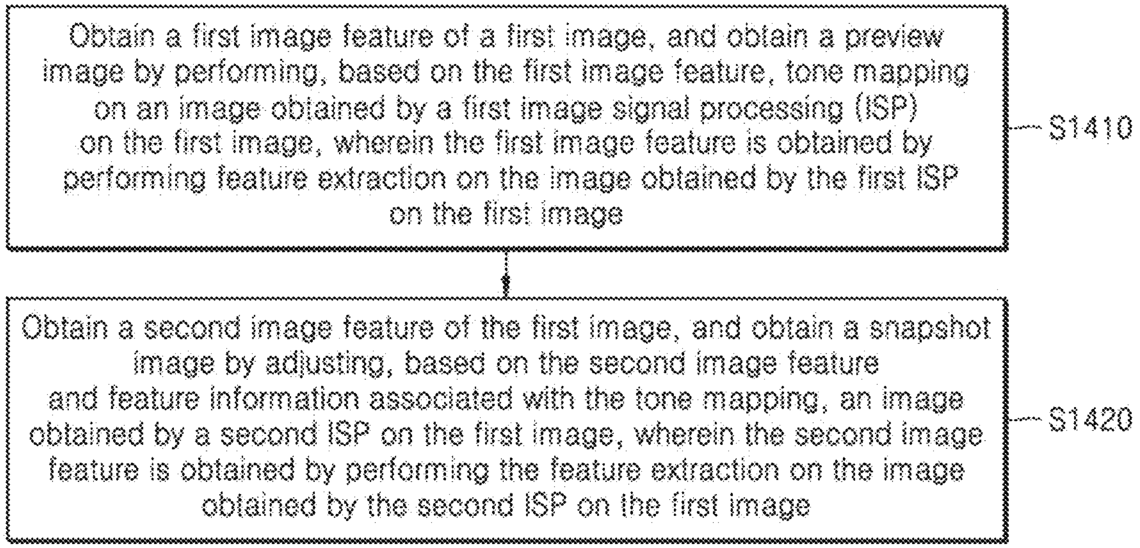
FIG. 14 is a flowchart illustrating a method performed by an electronic apparatus, according to an embodiment of the present disclosure.

As mentioned above, the present disclosure making the preview image and the snapshot image consistent, however, embodiments are not limited to being applied only in the method shown in FIG. 3, but may be applied separately. Therefore, the present disclosure also provides the method performed by an electronic apparatus described with reference to FIG. 14. FIG. 14 is a flowchart illustrating a method performed by an electronic apparatus according to an embodiment of the present disclosure.

Referring to FIG. 14, at step S1410, a first image feature of a first image is obtained, and a preview image is obtained by performing, based on the first image feature, tone mapping on an image obtained by a first image signal processing (ISP) on the first image, wherein the first image feature is obtained by performing feature extraction on the image obtained by the first ISP on the first image. At step S1420, a second image feature of the first image is obtained, and a snapshot image is obtained by adjusting, based on the second image feature and feature information associated with the tone mapping, an image obtained by a second ISP on the first image, wherein the second image feature is obtained by performing the feature extraction on the image obtained by the second ISP on the first image. Since the preview image is obtained by performing, based on the first image feature of the first image, the tone mapping on the image obtained by the first ISP on the first image, and the snapshot image is obtained by adjusting the image obtained by the second ISP on the first image using the feature information associated with the tone mapping, when obtaining the snapshot image, the consistency of the preview image and the snapshot image may be maintained.

According to an embodiment, step S1420 may include: performing a brightness level division of the first image based on the feature information; obtaining a feature map corresponding to each of divided brightness levels based on the second image feature; for each of the divided brightness levels, obtaining the snapshot image by adjusting, based on the feature map corresponding to the brightness level, pixel features within a range of the brightness level in the image obtained by the second ISP on the first image. For example, first, an interleaving brightness level division may be performed based on the feature information and a predetermined brightness level division, wherein adjacent brightness levels in the predetermined brightness level division are merged as one interleaving brightness level in the interleaving brightness level division. Next, the feature map corresponding to each of the divided interleaving brightness levels is obtained based on the second image feature and the interleaving brightness levels. Finally, for each of the interleaving brightness levels, the pixel features within the range of the interleaving brightness level are adjusted based on the feature map corresponding to the interleaving brightness level and the feature map corresponding to a higher brightness level included in a lower interleaving brightness level adjacent to the interleaving brightness level; the snapshot image is obtained based on the adjusted pixel features within the range of each of the interleaving brightness levels. The details involved in the above-described operation of obtaining the snapshot image have been described above and will not be repeated herein.

Figure 15:
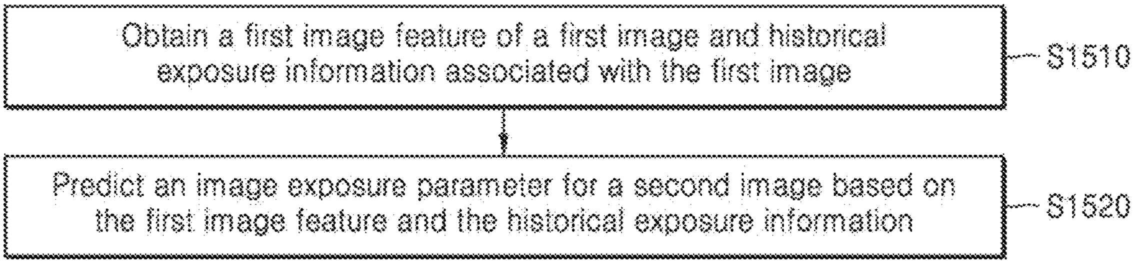
FIG. 15 is a flowchart illustrating a method performed by an electronic apparatus, according to an embodiment of the present disclosure.

Furthermore, as mentioned above, the historical exposure information is also not limited to being used for the prediction of the image exposure parameter together with the auxiliary information, and it is also possible to predict the image exposure parameter based on the historical exposure information and the image feature without the auxiliary information. Accordingly, the present disclosure also provides the method performed by an electronic apparatus described with reference to FIG. 15. FIG. 15 is a flowchart illustrating a method performed by an electronic apparatus according to yet another embodiment of the present disclosure.

With reference to FIG. 15, at step S1510, a first image feature of a first image and historical exposure information associated with the first image are obtained. At step S1520, an image exposure parameter for a second image is predicted based on the first image feature and the historical exposure information. Since the historical exposure information is considered at the time of the image exposure parameter, through predicting the image exposure parameter based on the image feature of the current image and the historical exposure information associated therewith, not only is it possible to predict the image exposure parameter more accurately, which thereby facilitates the acquisition of a higher-quality image, but also, since it is possible to predict the image exposure parameter of the second image based on the first image features and the historical exposure information, without the need to use the method of gradual convergence to the target exposure parameter value through constant comparison to obtain the image exposure parameter, and fast prediction of the exposure parameter is objectively also facilitated, the exposure stabilization time is shortened, and the shooting experience of the user is improved.

Alternatively, the method shown in FIG. 15 may further include: performing tone mapping on the first image based on the first image feature to obtain feature information associated with the tone mapping. In this case, the predicting of the image exposure parameter for the second image based on the first image feature and the historical exposure information may include: obtaining auxiliary information for an exposure parameter prediction based on the feature information, wherein the auxiliary information includes at least one of exposure adjustment direction information and exposure adjustment magnitude information; predicting the image exposure parameter based on the auxiliary information, the first image feature, and the historical exposure information. In the above, how to obtain the auxiliary information and how to predict the image exposure parameter based on the auxiliary information, the first image feature, and the historical exposure information have been described in detail, and will not be repeated herein.

In the above, the method performed by an electronic apparatus according to an embodiment of the present disclosure has been described. In the following, the electronic apparatus according to an embodiment of the present disclosure is briefly described.

Figure 16:
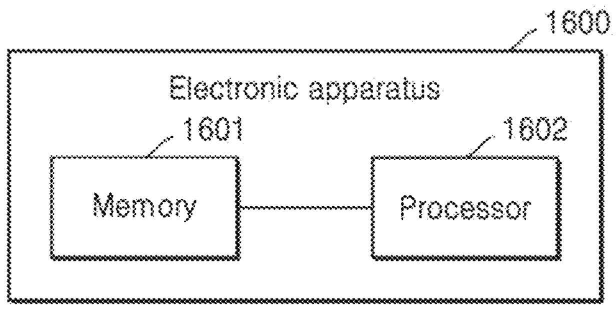
FIG. 16 is a block diagram illustrating an electronic apparatus, according to an embodiment of the present disclosure.

FIG. 16 is a block diagram illustrating an electronic apparatus according to an embodiment of the present disclosure. Referring to FIG. 16, the electronic apparatus 1600 may include memory 1601 and a processor 1602, wherein the processor 1602 is coupled to the memory 1601 and configured to perform any of the methods described above.

In an embodiment of the present disclosure, there is also provided an electronic apparatus that includes at least one processor, and alternatively, further includes at least one transceiver and/or at least one memory coupled to the at least one processor, wherein, the at least one processor is configured to perform the steps of the method provided in any alternative embodiment of the present disclosure.

Figure 17:
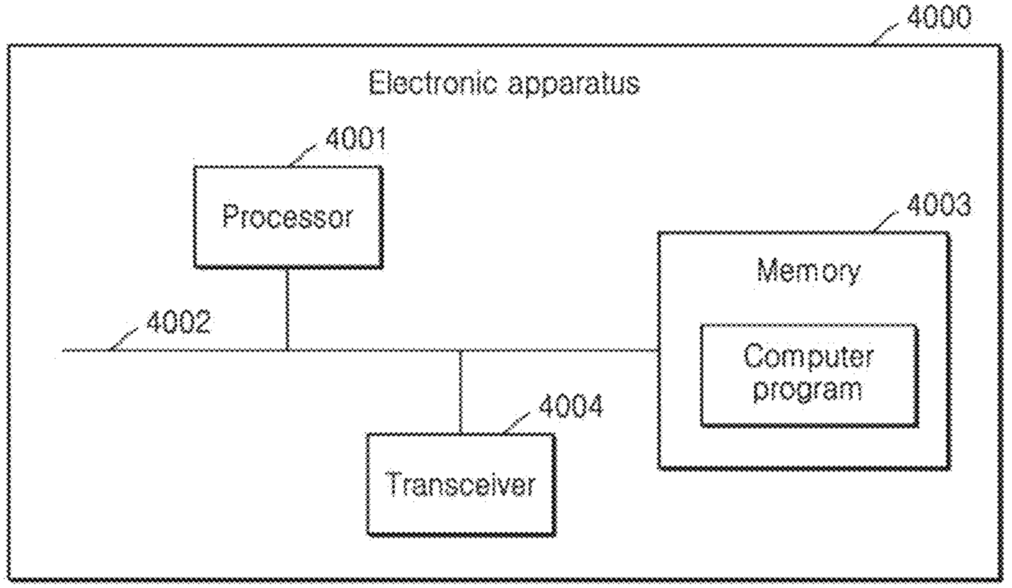
FIG. 17 is a schematic diagram illustrating a structure of an electronic apparatus, according to an embodiment of the present disclosure.

FIG. 17 illustrates a schematic diagram of a structure of an electronic apparatus 4000 applicable to an embodiment of the present application. As shown in FIG. 17, the electronic apparatus 4000 shown in FIG. 17 includes: a processor 4001 and memory 4003. Wherein the processor 4001 and the memory 4003 are coupled, e.g., through a bus 4002. Alternatively, the electronic apparatus 4000 may further include a transceiver 4004 which may be used for data interaction between the electronic apparatus and other electronic apparatuses, such as transmitting of data and/or receiving of data. It should be noted that, each of the processor 4001, the memory 4003, and the transceiver 4004 is not limited to one in a practice application, and the structure of the electronic apparatus 4000 does not constitute a limitation of the embodiments of the present disclosure. Alternatively, the electronic apparatus may be the first network node, the second network node, or the third network node.

The processor 4001 may be a Central Processing Unit (CPU), Digital Signal Processor (DSP), Application Specific Integrated Circuit (ASIC), Field Programmable Gate Array (FPGA) or other programmable logic device, transistor logic device, hardware part, or any combination thereof. It may implement or perform various exemplary logic boxes, modules, and circuits described in conjunction with the disclosed contents of the present disclosure. The processor 4001 may also be a combination that implements computing functions, such as a combination containing one or more microprocessors, a combination of a DSP and a microprocessor, and the like.

The bus 4002 may include a pathway to transfer information between the above components. The bus 4002 may be a Peripheral Component Interconnect (PCI) bus or an Extended Industry Standard Architecture (EISA) bus, and the like. The bus 4002 may be classed as an address bus, a data bus, a control bus, and the like. For ease of representation, only one bold line is shown in FIG. 17, but it does not mean that there is only one bus or one type of bus.

The memory 4003 may be a Read Only Memory (ROM) or other types of static storage apparatuses that can store static information and instructions, a Random Access Memory (RAM) or other types of dynamic storage apparatuses that can store information and instructions, may be an Electrically Erasable Programmable Read Only Memory (EEPROM), Compact Disc Read Only Memory (CD-ROM) or other optical disc storages, an optical disc storage (including a compressed disc, laser disc, optical disc, digital universal disc, Blu-ray disc, etc.), a disk storage medium, other magnetic storage apparatuses, or any other medium that can be used to carry or store computer programs and can be read by a computer, it is not limited herein.

The memory 4003 is used to store computer programs or executable instructions for performing the embodiments of the present disclosure, and is controlled for execution by the processor 4001. The processor 4001 is used to execute the computer programs or executable instructions stored in the memory 4003 to implement the steps shown in the preceding method of the embodiments.

An embodiment of the present disclosure provides a computer readable storage medium storing computer programs or instructions, the computer programs or instructions, when being executed by at least one processor may perform or implement the steps in the preceding method of the embodiments and corresponding contents.

An embodiment of the present disclosure provides a computer program product including computer programs, the computer programs, when being executed by a processor, may implement the steps shown in the preceding method of the embodiments and corresponding contents.

The terms "first", "second", "third", "fourth", "1", "2" and the like (if exists) in the disclosure are used to distinguish similar objects, and need not be used to describe a specific order or sequence. It should be understood that, data used as such may be interchanged in appropriate situations, so that the embodiments of the present disclosure described here may be implemented in an order other than the illustration or text description.

It should be understood that, although each operation step is indicated by an arrow in the flowcharts of the embodiments of the present disclosure, an implementation order of these steps is not limited to an order indicated by the arrows. Unless explicitly stated herein, in some implementation scenarios of the embodiments of the present disclosure, the implementation steps in the flowcharts may be executed in other orders according to requirements. In addition, some or all of the steps in each flowchart may include a plurality of sub steps or stages, based on an actual implementation scenario. Some or all of these sub steps or stages may be executed at the same time, and each sub step or stage in these sub steps or stages may also be executed at different times. In scenarios with different execution times, an execution order of these sub steps or stages may be flexibly configured according to a requirement, which is not limited by the embodiment of the present disclosure.

The above text and accompanying drawings are provided as examples only to assist readers in understanding the present disclosure. They are not intended and should not be interpreted as limiting the scope of the present disclosure in any way. Although embodiments and examples have been provided, based on the content disclosed herein, it is apparent to those skilled in the art that, changes can be made to the illustrated embodiments and examples without departing from the scope of the present disclosure, and other similar implementation methods based on the technical concepts of the present disclosure also belongs to a protection scope of the embodiments of the present disclosure.

In an embodiment, the predicting the image exposure parameter for the second image based on the first image feature and the feature information may include obtaining auxiliary information for an exposure parameter prediction based on the feature information, wherein the auxiliary information may include at least one of exposure adjustment direction information or exposure adjustment amplitude information. In an embodiment, the predicting the image exposure parameter for the second image based on the first image feature and the feature information may include predicting the image exposure parameter based on the auxiliary information and the first image feature.

In an embodiment, the method may include acquiring historical exposure information associated with the first image, wherein the predicting the image exposure parameter based on the auxiliary information and the first image feature may include predicting the image exposure parameter based on the auxiliary information, the first image feature, and the historical exposure information.

In an embodiment, the performing the tone mapping on the first image based on the first image feature to obtain the feature information associated with the tone mapping may include obtaining a brightness statistical feature of the first image based on the first image feature. In an embodiment, the performing the tone mapping on the first image based on the first image feature to obtain the feature information associated with the tone mapping may include obtaining global features of the first image using a deep learning network, based on the first image feature, wherein the global features may include brightness distribution information of the first image. In an embodiment, the performing the tone mapping on the first image based on the first image feature to obtain the feature information associated with the tone mapping may include obtaining the feature information based on the global features and the brightness statistical feature.

In an embodiment, the obtaining the auxiliary information for the exposure parameter prediction based on the feature information may include obtaining the auxiliary information based on the global features and the feature information.

In an embodiment, the obtaining the auxiliary information based on the global features and the feature information may include extracting a brightness feature based on the feature information. In an embodiment, the obtaining the auxiliary information based on the global features and the feature information may include identifying an overexposed region and an underexposed region of the first image based on the extracted brightness feature. In an embodiment, the obtaining the auxiliary information based on the global features and the feature information may include obtaining a first feature corresponding to the overexposed region and a second feature corresponding to the underexposed region based on the global features. In an embodiment, the obtaining the auxiliary information based on the global features and the feature information may include obtaining the auxiliary information based on the first feature and the second feature.

In an embodiment, the identifying the overexposed region and the underexposed region of the first image based on the extracted brightness feature may include obtaining first mask information corresponding to the overexposed region and the underexposed region based on the extracted brightness feature; obtaining a third feature corresponding to the overexposed region and a fourth feature corresponding to the underexposed region based on the global features and the first mask information. In an embodiment, the identifying the overexposed region and the underexposed region of the first image based on the extracted brightness feature may include semantically enhancing on the global features using a self-attention mechanism. In an embodiment, the identifying the overexposed region and the underexposed region of the first image based on the extracted brightness feature may include obtaining second mask information corresponding to the overexposed region and the underexposed region based on the third feature, the fourth feature and the semantically enhanced global features, wherein the obtaining the first feature corresponding to the overexposed region and the second feature corresponding to the underexposed region based on the global features may include obtaining the first feature and the second feature based on the global features and the second mask information.

In an embodiment, the method may include obtaining a preview image based on the tone mapping, wherein the first image feature is obtained through performing feature extraction on an image obtained by a first image signal processing (ISP) on the first image, the tone mapping may include performing the tone mapping on the image obtained by the first ISP on the first image. In an embodiment, the method may include acquiring a second image feature of the first image, and obtaining a snapshot image by adjusting, based on the second image feature and the feature information, an image obtained by a second ISP on the first image, wherein the second image feature is obtained through performing the feature extraction on the image obtained by the second ISP on the first image.

In an embodiment, the obtaining the snapshot image by adjusting, based on the second image feature and the feature information, the image obtained by the second ISP on the first image may include performing a brightness level division of the first image based on the feature information. In an embodiment, the obtaining the snapshot image by adjusting, based on the second image feature and the feature information, the image obtained by the second ISP on the first image may include obtaining a feature map corresponding to each of divided brightness levels based on the second image feature. In an embodiment, the obtaining the snapshot image by adjusting, based on the second image feature and the feature information, the image obtained by the second ISP on the first image may include for each brightness level of the divided brightness levels, obtaining the snapshot image by adjusting, based on the feature map corresponding to the brightness level, pixel features within a range of the brightness level in the image obtained by the second ISP on the first image.

In an embodiment, the performing the brightness level division of the first image based on the feature information may include performing an interleaving brightness level division based on the feature information and a predetermined brightness level division, wherein adjacent brightness levels in the predetermined brightness level division are merged as one interleaving brightness level in the interleaving brightness level division, wherein the obtaining the feature map corresponding to each of the divided brightness levels based on the second image feature may include obtaining the feature map corresponding to each of divided interleaving brightness levels based on the second image feature and the interleaving brightness levels, and wherein for each brightness level of the divided brightness levels, the obtaining the snapshot image by adjusting, based on the feature map corresponding to the brightness level, the pixel features within the range of the brightness level in the image obtained by the second ISP on the first image may include: for each of the interleaving brightness levels, adjusting the pixel features within the range of the interleaving brightness level based on the feature map corresponding to the interleaving brightness level and the feature map corresponding to a higher brightness level included in a lower interleaving brightness level adjacent to the interleaving brightness level; and obtaining the snapshot image based on the adjusted pixel features within the range of each of the interleaving brightness levels.

In an embodiment, the predicting the image exposure parameter based on the auxiliary information, the first image feature, and the historical exposure information may include identifying respective fusion ratios of the auxiliary information and the historical exposure information when used for predicting the image exposure parameter, based on the historical exposure information. In an embodiment, the predicting the image exposure parameter based on the auxiliary information, the first image feature, and the historical exposure information may include predicting the image exposure parameter by fusing, according to the fusion ratios, the first image feature, the auxiliary information and the historical exposure information.

In an embodiment, identifying the respective fusion ratios of the auxiliary information and the historical exposure information when used for predicting the image exposure parameter, based on the historical exposure information may include obtaining first image information based on the first image feature and exposure parameter information of the first image. In an embodiment, identifying the respective fusion ratios of the auxiliary information and the historical exposure information when used for predicting the image exposure parameter, based on the historical exposure information may include identifying the fusion ratios based on a correlation relationship between the first image information and the historical exposure information.

In an embodiment, the method may include updating the historical exposure information using exposure parameter information of the first image, based on a correlation relationship between the first image information and the historical exposure information, wherein the first image information is obtained based on the first image feature and the exposure parameter information of the first image.

In an embodiment, the method may include acquiring a first image feature of a first image, and obtaining a preview image by performing, based on the first image feature, tone mapping on an image obtained by a first image signal processing (ISP) on the first image, wherein the first image feature is obtained by performing feature extraction on the image obtained by the first ISP on the first image. In an embodiment, the method may include acquiring a second image feature of the first image, and obtaining a snapshot image by adjusting, based on the second image feature and feature information associated with the tone mapping, an image obtained by a second ISP on the first image, wherein the second image feature is obtained by performing the feature extraction on the image obtained by the second ISP on the first image; and providing the snapshot image to a display.

In an embodiment, the obtaining the snapshot image by adjusting, based on the second image feature and the feature information, the image obtained by the second ISP on the first image may include. performing a brightness level division of the first image based on the feature information. In an embodiment, the obtaining the snapshot image by adjusting, based on the second image feature and the feature information, the image obtained by the second ISP on the first image may include obtaining a feature map corresponding to each of divided brightness levels based on the second image feature. In an embodiment, the obtaining the snapshot image by adjusting, based on the second image feature and the feature information, the image obtained by the second ISP on the first image may include for each brightness level of the divided brightness levels, obtaining the snapshot image by adjusting, based on the feature map corresponding to the brightness level, pixel features within a range of the brightness level in the image obtained by the second ISP on the first image.

In an embodiment, the performing the brightness level division of the first image based on the feature information may include performing an interleaving brightness level division based on the feature information and a predetermined brightness level division, wherein adjacent brightness levels in the predetermined brightness level division are merged as one interleaving brightness level in the interleaving brightness level division, wherein the obtaining the feature map corresponding to each of the divided brightness levels based on the second image feature may include: obtaining the feature map corresponding to each of divided interleaving brightness levels based on the second image feature and the interleaving brightness levels, and wherein for each of the divided brightness levels, obtaining of the snapshot image by adjusting, based on the feature map corresponding to the brightness level, the pixel features within the range of the brightness level in the image obtained by the second ISP on the first image may include: for each of the interleaving brightness levels, adjusting the pixel features within the range of the interleaving brightness level based on the feature map corresponding to the interleaving brightness level and the feature map corresponding to a higher brightness level included in a lower interleaving brightness level adjacent to the interleaving brightness level; obtaining the snapshot image based on the adjusted pixel features within the range of each of the interleaving brightness levels.

In an embodiment, the method may include acquiring a first image feature of a first image and historical exposure information associated with the first image; and predicting an image exposure parameter for a second image based on the first image feature and the historical exposure information.

In an embodiment, the method may further include performing tone mapping on the first image based on the first image feature to obtain feature information associated with the tone mapping, wherein the predicting the image exposure parameter for the second image based on the first image feature and the historical exposure information may include: obtaining auxiliary information for an exposure parameter prediction based on the feature information, wherein the auxiliary information may include at least one of exposure adjustment direction information and exposure adjustment magnitude information; and predicting the image exposure parameter based on the auxiliary information, the first image feature, and the historical exposure information.

What is claimed is:

1. A method for automatic exposure control using tone mapping, the method comprising:

obtaining a first image feature of a first image;

performing tone mapping on the first image based on the first image feature to obtain feature information associated with the tone mapping; and predicting an image exposure parameter for a second image based on the first image feature and the feature information, wherein the second image is a next frame image of the first image; and controlling an automatic exposure of the second image based on the image exposure parameter.

2. The method of claim 1, wherein the predicting the image exposure parameter for the second image based on the first image feature and the feature information comprises:

obtaining auxiliary information for the exposure parameter prediction based on the feature information, wherein the auxiliary information comprises at least one of exposure adjustment direction information or exposure adjustment amplitude information; and predicting the image exposure parameter based on the auxiliary information and the first image feature.

3. The method of claim 2, further comprising:

obtaining historical exposure information associated with the first image, wherein the predicting the image exposure parameter based on the auxiliary information and the first image feature comprises predicting the image exposure parameter based on the auxiliary information, the first image feature, and the historical exposure information.

4. The method of claim 3, wherein the performing the tone mapping on the first image based on the first image feature to obtain the feature information associated with the tone mapping comprises:

obtaining a brightness statistical feature of the first image based on the first image feature;

obtaining global features of the first image using a deep learning network, based on the first image feature, wherein the global features comprise brightness distribution information of the first image; and obtaining the feature information based on the global features and the brightness statistical feature.

5. The method of claim 4, wherein the obtaining the auxiliary information for the exposure parameter prediction based on the feature information comprises obtaining the auxiliary information based on the global features and the feature information.

6. The method of claim 5, wherein the obtaining the auxiliary information based on the global features and the feature information comprises:

obtaining a brightness feature based on the feature information;

identifying an overexposed region and an underexposed region of the first image based on the obtained brightness feature;

obtaining a first feature corresponding to the overexposed region and a second feature corresponding to the underexposed region based on the global features; and obtaining the auxiliary information based on the first feature and the second feature.

7. The method of claim 6, wherein the identifying the overexposed region and the underexposed region of the first image based on the obtained brightness feature comprises:

obtaining first mask information corresponding to the overexposed region and the underexposed region based on the obtained brightness feature;

obtaining a third feature corresponding to the overexposed region and a fourth feature corresponding to the underexposed region based on the global features and the first mask information;

semantically enhancing on the global features using a self-attention mechanism; and obtaining second mask information corresponding to the overexposed region and the underexposed region based on the third feature, the fourth feature and the semantically enhanced global features, wherein the obtaining the first feature corresponding to the overexposed region and the second feature corresponding to the underexposed region based on the global features comprises obtaining the first feature and the second feature based on the global features and the second mask information.

8. The method of claim 3, wherein the predicting the image exposure parameter based on the auxiliary information, the first image feature, and the historical exposure information comprises:

identifying respective fusion ratios of the auxiliary information and the historical exposure information when used for predicting the image exposure parameter, based on the historical exposure information;

predicting the image exposure parameter by fusing, according to the fusion ratios, the first image feature, the auxiliary information and the historical exposure information.

9. The method of claim 8, wherein identifying the respective fusion ratios of the auxiliary information and the historical exposure information when used for predicting the image exposure parameter, based on the historical exposure information comprises:

obtaining first image information based on the first image feature and exposure parameter information of the first image; and identifying the fusion ratios based on a correlation relationship between the first image information and the historical exposure information.

10. The method of claim 3, further comprising:

updating the historical exposure information using exposure parameter information of the first image, based on a correlation relationship between the first image information and the historical exposure information, wherein the first image information is obtained based on the first image feature and the exposure parameter information of the first image.

11. The method of claim 1, further comprising:

obtaining a preview image based on the tone mapping, wherein the first image feature is obtained through performing feature extraction on an image obtained by a first image signal processing (ISP) on the first image, the tone mapping comprising performing the tone mapping on the image obtained by the first ISP on the first image; and/or obtaining a second image feature of the first image, and obtaining the snapshot image by adjusting, based on the second image feature and the feature information, an image obtained by a second ISP on the first image, wherein the second image feature is obtained through performing the feature extraction on the image obtained by the second ISP on the first image.

12. The method of claim 11, wherein the obtaining the snapshot image by adjusting, based on the second image feature and the feature information, the image obtained by the second ISP on the first image comprises:

performing a brightness level division of the first image based on the feature information;

obtaining a feature map corresponding to at least one of divided brightness levels based on the second image feature; and for at least one level of the divided brightness levels, obtaining the snapshot image by adjusting, based on the feature map corresponding to the brightness level, pixel features within a range of the brightness level in the image obtained by the second ISP on the first image.

13. The method of claim 12, wherein the performing the brightness level division of the first image based on the feature information comprises:

performing an interleaving brightness level division based on the feature information and a predetermined brightness level division, wherein adjacent brightness levels in the predetermined brightness level division are merged as one interleaving brightness level in the interleaving brightness level division, wherein the obtaining the feature map corresponding to at least one of the divided brightness levels based on the second image feature comprises: obtaining the feature map corresponding to at least one of divided interleaving brightness levels based on the second image feature and the interleaving brightness levels, and wherein for at least of one level of the divided brightness levels, the obtaining the snapshot image by adjusting, based on the feature map corresponding to the brightness level, the pixel features within the range of the brightness level in the image obtained by the second ISP on the first image comprises:

for at least one of the interleaving brightness levels, adjusting the pixel features within the range of the interleaving brightness level based on the feature map corresponding to the interleaving brightness level and the feature map corresponding to a higher brightness level comprised in a lower interleaving brightness level adjacent to the interleaving brightness level; and obtaining the snapshot image based on the adjusted pixel features within the range of at least one of the interleaving brightness levels.

14. The method of claim 11, further comprising:

providing the snapshot image to a display.

15. The method of claim 11, wherein the obtaining the snapshot image by adjusting, based on the second image feature and the feature information, the image obtained by the second ISP on the first image comprises:

performing a brightness level division of the first image based on the feature information;

obtaining a feature map corresponding to at least one of divided brightness levels based on the second image feature; and for at least of one level of the divided brightness levels, obtaining the snapshot image by adjusting, based on the feature map corresponding to the brightness level, pixel features within a range of the brightness level in the image obtained by the second ISP on the first image.

16. The method of claim 15, wherein the performing of the brightness level division of the first image based on the feature information comprises: performing an interleaving brightness level division based on the feature information and a predetermined brightness level division, wherein adjacent brightness levels in the predetermined brightness level division are merged as one interleaving brightness level in the interleaving brightness level division, wherein the obtaining of the feature map corresponding to at least one of the divided brightness levels based on the second image feature comprises: obtaining the feature map corresponding to at least one of divided interleaving brightness levels based on the second image feature and the interleaving brightness levels, and wherein for at least one of the divided brightness levels, obtaining of the snapshot image by adjusting, based on the feature map corresponding to the brightness level, the pixel features within the range of the brightness level in the image obtained by the second ISP on the first image comprises:

for at least one of the interleaving brightness levels, adjusting the pixel features within the range of the interleaving brightness level based on the feature map corresponding to the interleaving brightness level and the feature map corresponding to a higher brightness level comprised in a lower interleaving brightness level adjacent to the interleaving brightness level; and obtaining the snapshot image based on the adjusted pixel features within the range of at least one of the interleaving brightness levels.

17. The method of claim 1, further comprising:

obtaining a first image feature of a first image and historical exposure information associated with the first image;

predicting an image exposure parameter for a second image based on the first image feature and the historical exposure information.

18. The method of claim 17, further comprising:

performing tone mapping on the first image based on the first image feature to obtain feature information associated with the tone mapping, wherein the predicting of the image exposure parameter for the second image based on the first image feature and the historical exposure information comprises:

obtaining auxiliary information for an exposure parameter prediction based on the feature information, wherein the auxiliary information comprises at least one of exposure adjustment direction information and exposure adjustment magnitude information; and predicting the image exposure parameter based on the auxiliary information, the first image feature, and the historical exposure information.

19. An electronic apparatus for automatic exposure control using tone mapping, the electronic apparatus comprising:

memory storing instructions;

at least one processor including processing circuitry, memory storing instructions that, when executed by the at least one processor individually or collectively, cause the electronic apparatus to:

obtain a first image feature of a first image;

perform tone mapping on the first image based on the first image feature to obtain feature information associated with the tone mapping; and predict an image exposure parameter for a second image based on the first image feature and the feature information, wherein the second image is a next frame image of the first image; and control an automatic exposure of the second image based on the image exposure parameter.

20. A non-transitory computer-readable storage medium storing instructions that, when executed by at least one processor, cause the at least one processor to perform a method comprising:

obtaining a first image feature of a first image;

performing tone mapping on the first image based on the first image feature to obtain feature information associated with the tone mapping; and predicting an image exposure parameter for a second image based on the first image feature and the feature information, wherein the second image is a next frame image of the first image; and control an automatic exposure of the second image based on the image exposure parameter.

* * * * *